(12) United States Patent
Baublits et al.

(10) Patent No.: US 11,659,845 B2
(45) Date of Patent: May 30, 2023

(54) METHOD OF PACKAGING FRESH MEAT PRODUCTS IN A LOW OXYGEN ENVIRONMENT, MEAT COLOR IMPROVEMENT SOLUTION AND PRE-PACKAGED FOOD PRODUCT

(75) Inventors: Robert Ty Baublits, Colcord, OK (US); Jason Thomas Sawyer, Stephenville, TX (US)

(73) Assignee: TYSON FOODS, INC.

( * ) Notice: Subject to any disclaimer, the term of this patent is extended or adjusted under 35 U.S.C. 154(b) by 0 days.

(21) Appl. No.: 13/577,871

(22) PCT Filed: Apr. 16, 2010

(86) PCT No.: PCT/YS2010/031478
§ 371 (c)(1),
(2), (4) Date: Aug. 8, 2012

(87) PCT Pub. No.: WO2011/129838
PCT Pub. Date: Oct. 20, 2011

(65) Prior Publication Data
US 2012/0301577 A1 Nov. 29, 2012

(51) Int. Cl.
*A23B 4/16* (2006.01)
*A23B 4/20* (2006.01)

(52) U.S. Cl.
CPC . *A23B 4/16* (2013.01); *A23B 4/20* (2013.01)

(58) Field of Classification Search
CPC .................................... A23B 4/20; A23B 4/16
USPC ................. 426/49, 264, 644, 645, 647, 652
See application file for complete search history.

(56) References Cited

U.S. PATENT DOCUMENTS

| | | | |
|---|---|---|---|
| 4,434,187 A | | 2/1984 | Chandler et al. |
| 4,786,515 A | * | 11/1988 | Miller et al. .................. 426/281 |
| 5,045,332 A | | 9/1991 | Graf et al. |
| 5,384,149 A | | 1/1995 | Lin |
| 5,989,610 A | | 11/1999 | Ruzek |
| 6,217,925 B1 | | 4/2001 | Kim |
| 7,037,543 B2 | | 5/2006 | Sandusky et al. |
| 7,550,162 B2 | | 6/2009 | Berdahl et al. |
| 11,071,304 B2 | | 7/2021 | Husgen et al. |
| 2002/0192340 A1 | | 12/2002 | Swart et al. |
| 2003/0152679 A1 | * | 8/2003 | Garwood ..................... 426/392 |

(Continued)

FOREIGN PATENT DOCUMENTS

GB    2235616 A   *   3/1991

OTHER PUBLICATIONS

Tarte et al. Ingredients in Meat Products, Springer, 2009 pp. 397-400.*

(Continued)

*Primary Examiner* — Vera Stulii
(74) *Attorney, Agent, or Firm* — Mcafee & Taft

(57) ABSTRACT

A method of packaging a fresh meat product in a low oxygen environment is provided. The method comprises applying a natural plant component to a surface of the fresh meat product and sealing the fresh meat product in a package that contains a low oxygen environment. The natural plant component includes a sufficient amount of nitrites to convert myoglobin in the fresh meat product to nitrosomyoglobin and thereby improve the color of the fresh meat product. A meat color improvement solution and a pre-packaged food product are also provided.

41 Claims, 22 Drawing Sheets

(56) References Cited

U.S. PATENT DOCUMENTS

| | | |
|---|---|---|
| 2006/0078657 A1 | 4/2006 | Sandusky et al. |
| 2006/0147588 A1 | 7/2006 | Garwood |
| 2006/0246242 A1 | 11/2006 | Siegel et al. |
| 2007/0104901 A1 | 5/2007 | Siegel et al. |
| 2007/0141228 A1* | 6/2007 | Korleski ............... 426/641 |
| 2007/0275134 A1 | 11/2007 | Siegel et al. |
| 2008/0305213 A1 | 12/2008 | Husgen et al. |
| 2009/0098254 A1 | 4/2009 | Baublits et al. |
| 2014/0242217 A1 | 8/2014 | Husgen et al. |

OTHER PUBLICATIONS

Brian Lynn Krause Incubation of curing brines for the production of ready-to-eat uncured ham 2009 Iowa State University http://lib.dr.iastate.edu/cgi/viewcontent.cgi?article=3128&context=etd.*

Coma, Veronique, Bioactive packaging technologies for extended shelf life of meat-based products, Meat Science (Elsevier) vol. 78; p. 90-103 (2008).

Brody, Aaron L., Active Packaging Becomes More Active, Food Technology Magazine (Institute of Food Technologies) vol. 59, No. 12; p. 82-84 (Dec. 2005).

Cornforth, Daren P. and Hunt, Melvin C., Low-Oxygen Packaging of Fresh Meat with Carbon Monoxide: Meat Quality, Microbiology and Safety, American Meat Science Association (Savoy, IL)—White Paper Series No. 2, p. 1-10 (Jan. 2008).

Guidelines for Meat Color Evaluation, American Meat Science Association (Savoy, IL) p. 3-17 (1991).

Siegel, Dan, Vacuum Packaging Fresh Meat with Nitrite Containing Film, Reciprocal Meats Conference—presentation, Rogers, Arkansas Jun. 22, 2009.

Sebranek, Joseph G. and Bacus, James N., Cured meat products without direct addition of nitrate or nitrite: what are the issues?, Meat Science 77 (2007) pp. 136-147.

Jayasingh, Preetha, Cornforth, Charles E., Carpenter, Charles E., and Whittier, Dick, Evaluation of carbon monoxide treatment in modified atmosphere packaging or vacuum packaging to increase color stability of fresh beef, Meat Science vol. 59, Issue 3, Nov. 2001, pp. 317-324.

Ray, Frederick K., Meat Curing, Division of Agricultural Sciences and Natural Resources, Oklahoma State University, ANSI-3994-ANSI-3994-4, date unknown.

American Meat Institute, Ground Beef Shelf Life (Days); http://www.meatami.eom/ht/a/GetDocumentAction/i/5909, date unknown.

Panel 1 Vitamin C in Food Processing, Takeda U.S.A., Inc., http://www.mratcliffe.com/images/vcb.pdf, date unknown.

International Search Report and Written Opinion dated Oct. 6, 2010 in corresponding international application No. PCT/US10/31478, Tyson Foods, Inc.

Office Action dated Sep. 18, 2014 in corresponding Mexican application No. MX/a/2012-008596, Tyson Foods, Inc.

Office Action dated May 16, 2013 in corresponding Canadian patent application No. 2,789,379, Tyson Foods, Inc.

Office Action dated Mar. 7, 2014 in corresponding Canadian patent application No. 2,789,379, Tyson Foods, Inc.

Patent Examination Report No. 1 dated Jan. 31, 2013 in corresponding Australian application No. 2010351039, Tyson Foods, Inc.

First Examination Report dated Jun. 12, 2013 in corresponding New Zealand application No. 601960, Tyson Foods, Inc.

Further Examination Report dated Oct. 17, 2014 in corresponding New Zealand application No. 601960, Tyson Foods, Inc.

Official Action dated Nov. 29, 2013 in corresponding Russian application No. 2012148701, Tyson Foods, Inc.

* cited by examiner

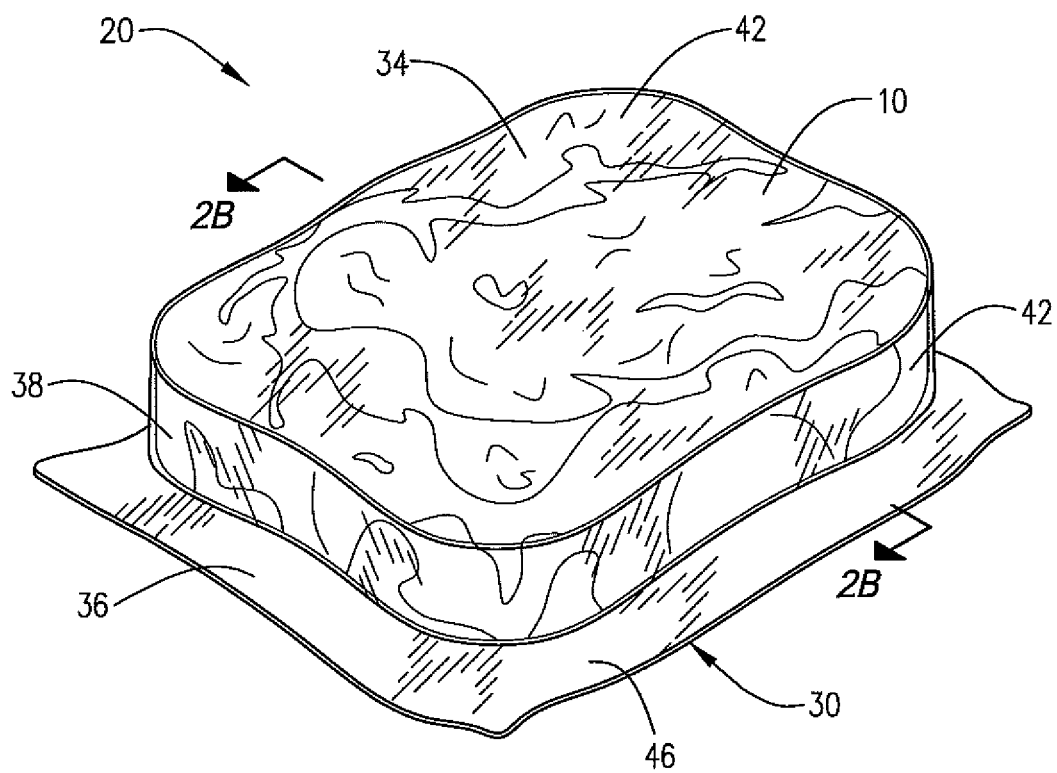
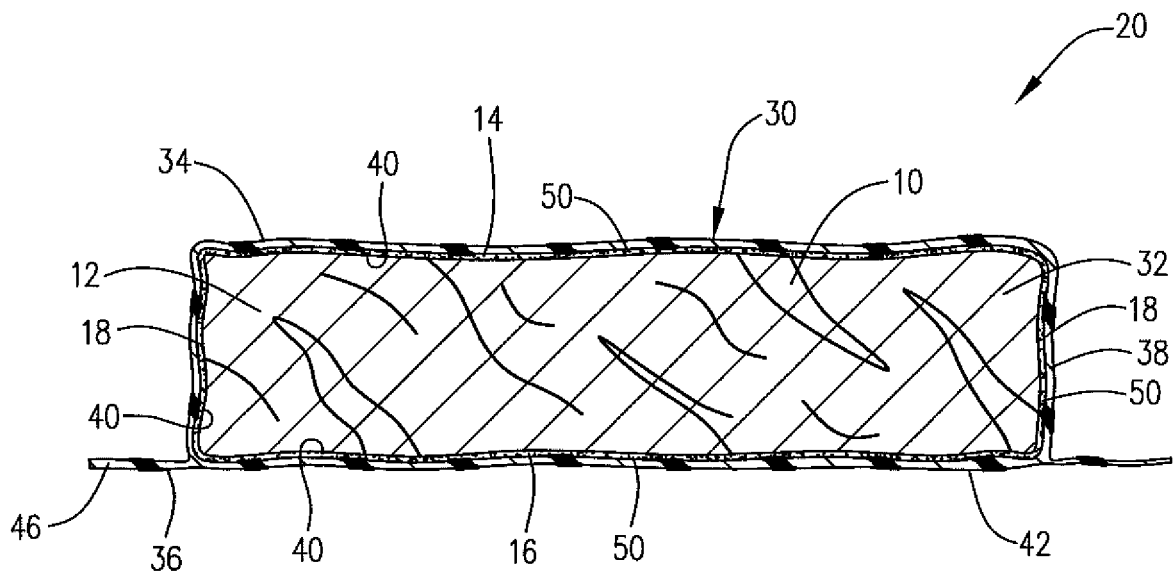
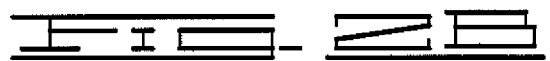

METHOD OF PACKAGING FRESH MEAT PRODUCTS IN A LOW OXYGEN ENVIRONMENT, MEAT COLOR IMPROVEMENT SOLUTION AND PRE-PACKAGED FOOD PRODUCT

In recent years, fresh meat products such as fresh beef and poultry have been processed by packers and wholesalers at central locations and then sold to grocery stores and other retail outlets in pre-cut, pre-packaged ("case ready") form. Processing and packaging fresh meat products in this manner can be more efficient than the more traditional method of processing and packaging fresh meat products in meat departments or "butcher shops" located directly within retail stores.

One potential drawback to the case ready processing, packaging and delivery system is the extended amount time that can occur between the processing and packaging steps and the ultimate sale of the meat products to the consumer. Traditionally, fresh meat products have been packaged at the retail outlet by placing the products on a foam tray and over-wrapping the tray and products with a polyvinyl chloride ("PVC") wrap. Products packaged in this manner typically have two to five days of shelf life, which is not sufficient for case ready products.

In view of the problems associated with the use of traditional packaging methods in connection with case ready and similar pre-packaged fresh meat products, methods have been developed to impart an extended shelf life to the products. Modified atmosphere packaging ("MAP"), a type of packaging that replaces the air in the package with a different gas combination, can increase the shelf life of the meat products to approximately 20 days. The substituted gas combination, which can be oxygen rich or oxygen lean, is designed to mitigate microbial growth and maintain the freshness of the meat products. Vacuum packaging, a technique in which virtually all of the gas in the package is removed before the package is sealed, can impart a shelf life to the products of at least 20 to 35 days. Furthermore, meat products packaged using vacuum packaging techniques are well suited for freezing, which can further extend the useful life of the product. The increased shelf life associated with modified air packaging and vacuum packaging provides more time for the fresh meat products to be distributed, merchandised and sold.

Vacuum packaging and low oxygen modified air packaging are very useful in connection with case ready fresh meat products. The lack of or low amount of oxygen in contact with the meat products helps maintain the freshness of the products. A low oxygen environment mitigates the growth of most microbiological organisms and decreases the rate of lipid oxidation, which can produce an off flavor. Nevertheless, vacuum packaging and low oxygen modified air packaging techniques have not been widely accepted in all markets due to the color of the associated meat products.

The color of fresh meat is dependent on a molecule known as myoglobin, which is located in the muscle tissue. Myoglobin is a protein-iron-porphyrin molecule similar to hemoglobin. The color that myoglobin produces is dependent on the chemical state (oxidized or reduced) of the iron in the myoglobin as well as the nature of the compounds attached thereto. In an oxygen environment, oxygen molecules bind to myoglobin thereby producing oxymyoglobin. Oxymyoglobin gives raw meat a red appearance, a color that consumers associate with fresh meat products.

In low oxygen packaging environments, myoglobin is in a deoxygenated state (deoxymyoglobin). When the myoglobin is in this state, the meat products often have a purple color, which tends to give consumers the false impression that the meat products are no longer fresh. Thus, low oxygen packaging formats have not successfully penetrated the retail market even though they provide the longest shelf life.

The present invention includes a method of packaging a fresh meat product in a low oxygen environment, a meat color improvement solution for improving the color of a fresh meat product and a pre-packaged food product.

The inventive method comprises the steps of applying a natural plant component to a surface of the fresh meat product, and sealing the fresh meat product in a package that contains a low oxygen environment. The natural plant component includes a sufficient amount of nitrites to convert myoglobin in the fresh meat product to nitrosomyoglobin and thereby improve the color of the fresh meat product.

The natural plant component can be applied to the surface of the fresh meat product by admixing the natural plant component in a base liquid to form a meat color improvement solution, and applying the meat color improvement solution to the surface. The meat color improvement solution can further comprise a diffusion mitigation agent for mitigating the diffusion of the nitrites into the interior of the fresh meat product.

The inventive meat color improvement solution comprises a base liquid, a natural plant component present in the base liquid and a diffusion mitigation agent present in the base liquid. The natural plant component includes a sufficient amount of nitrites to convert myoglobin in the fresh meat product to nitrosomyoglobin and thereby improve the color the fresh meat product. The diffusion mitigation agent mitigates the diffusion of the nitrites into the interior of the fresh meat product.

The inventive pre-packaged food product comprises a fresh meat product that has been treated with a meat color improvement solution, and a package containing the fresh meat product in a low oxygen environment. The meat color improvement solution includes a base liquid, a natural plant component present in the base liquid and a diffusion mitigation agent present in the base liquid. The natural plant component includes a sufficient amount of nitrites to convert myoglobin in the fresh meat product to nitrosomyoglobin and thereby improve the color the fresh meat product. The diffusion mitigation agent functions to mitigate the diffusion of the nitrites into the interior of the fresh meat product.

BRIEF DESCRIPTION OF THE DRAWINGS

FIG. 2A is a perspective view of the inventive pre-packaged food product, namely the fresh beef strip loin shown by FIGS. 1A and 1B as packaged in accordance with the inventive method using a vacuum packaging technique.

FIG. 2B is a cross-sectional view taken along line 2B of FIG. 2A.

DETAILED DESCRIPTION

Figure 1A:
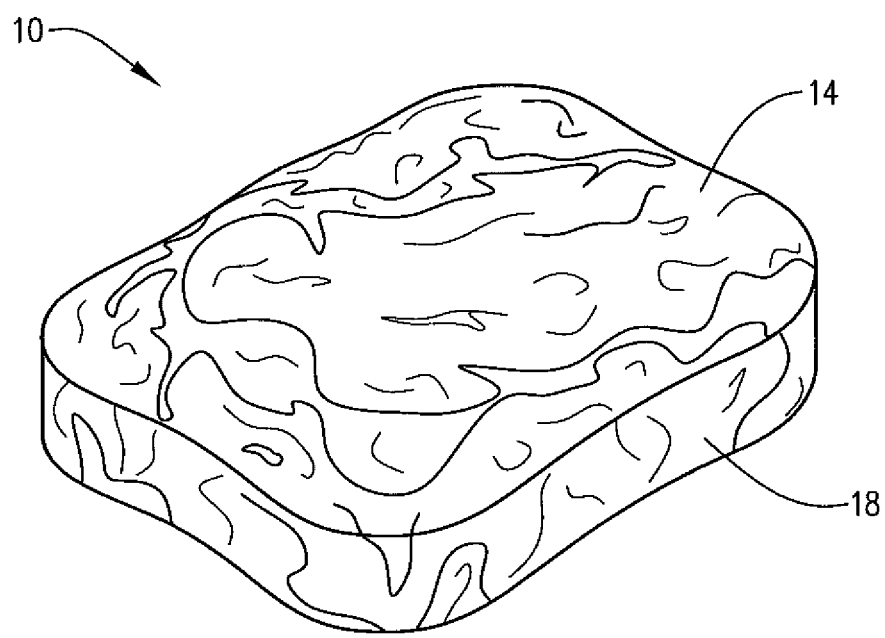
FIG. 1A is a perspective view illustrating the top and side portion of a fresh beef strip loin that can be treated with the inventive meat color improvement solution and/or packaged in accordance with the inventive method.

The present invention includes a method of packaging a fresh meat product in a low oxygen environment, a meat color improvement solution for improving the color of a fresh meat product and a pre-packaged food product.

The inventive method of packaging a fresh meat product in a low oxygen environment comprises the steps of applying a natural plant component to a surface of the fresh meat product, and sealing the fresh meat product in a package that contains a low oxygen environment. As used herein and in the appended claims, a fresh meat product means any meat product containing myoglobin and that has not been cooked or cured. The fresh meat product may include additional ingredients such as salts, phosphates, antioxidants, antimicrobial agents, spices, water, broths, proteins, flavoring and sugars which are used for non-curing purposes. Examples of fresh meat products that can be packaged in accordance with the inventive method include beef, pork, poultry, fish, lamb and veal. For example, the fresh meat product can be selected from beef, chicken and pork.

The fresh meat products can be in a variety of forms, including meat cuts and ground meat (for example, ground beef). Examples of meat cuts include primal cuts, subprimal cuts and retail cuts. Primal cuts include beef loins, pork loins, beef ribs, pork hams, and beef rounds. Subprimal cuts include beef strips, beef rib eyes, beef top sirloins, pork shoulder butts, pork center cut loins, pork sirloins, and beef bottom round flats. Retail cuts include sirloin steaks, stew meat, cube steaks, country style ribs, pork chops, blade steaks, cutlets, poultry thighs, poultry breasts, and poultry tenders.

As used herein and in the appended claims, a package that contains a low oxygen environment means a package in which the amount of oxygen is no greater than 5% by volume based on the total volume of gas in the package. In one embodiment, the amount of oxygen in the package is no greater than about 1% by volume based on the total volume of gas in the package. In another embodiment, the amount of oxygen in the package is no greater than about 0.5% by volume based on the total volume of gas in the package. As used herein, a low oxygen environment can be an environment that is completely void of oxygen. A low oxygen environment maximizes the shelf-life and prolongs the freshness of the meat product. The growth of most microbial organisms is mitigated in a low oxygen environment. Furthermore, low oxygen environments mitigate oxidation reactions that can shorten the color life and disturb the flavor of the meat products.

The natural plant component used in the inventive method includes a sufficient amount of nitrites to convert myoglobin in the fresh meat product to nitrosomyoglobin and thereby improve the color of the fresh meat product. In fresh meat products, the binding state of myoglobin determines color. Nitrosomyoglobin produces a red pigment, but the overall color of the meat product is largely dependent on the amount of myoglobin that is available to form nitrosomyoglobin. For example, beef contains high levels of myoglobin and, as a result, the conversion to nitrosomyoglobin on the surface of a fresh beef product will result in an overall surface which is pink to red in appearance. On the other hand, poultry, pork and fish tend to have relatively lower myoglobin levels as compared to beef. As a result, the formation of nitrosomyoglobin in connection with poultry, pork and fish will typically result in more of a light pink color as opposed to a darker pink or red color. Consumers tend to associate a these colors with the freshness of the corresponding meat product. Thus, as used herein and in the appended claims, "to improve the color" of a fresh meat product means to produce a color in the meat product that consumers associate with freshness as explained herein. Accordingly, for example, if the fresh meat product is beef, "to improve the color" means to increase the "redness" of the beef. If the fresh meat product is chicken, pork or fish, "to improve the color" means to make the chicken, pork or fish have more of a light pink appearance.

A more quantifiable definition of color can be provided using standard color scales. The "a* value" is widely used in the meat industry to quantify meat "redness" using colorimetric devices. Thus, as used herein, "to improve the color" in a fresh meat product can be additionally defined as increasing the "a* value" associated with the meat product as measured using a colorimetric device. The use of color scales to evaluate fresh meat color is shown by the examples set forth below.

As used herein and in the appended claims, a natural plant component means a whole plant or a portion or extract thereof. The natural plant component can be obtained by a variety of methods known in the art and can be used in a variety of forms including, but not limited to, ground whole plants, portions of plants and powder formed from specific plant extracts. The natural plant components contain either nitrites or related compounds such as nitrates that can be converted to nitrites.

Many (if not most) natural plant components comprise predominantly nitrates ($NO_3$) as opposed to nitrites ($NO_2$). For example, as shown by the examples set forth below, dry celery powder contains predominantly nitrates as opposed to nitrites. As a result, in order to assure that the natural plant components include a sufficient amount of nitrites to convert myoglobin in the fresh meat product to nitrosomyoglobin and thereby improve the color of the fresh meat product in accordance with the invention, most natural plant components (including the dry celery powder used in the examples set forth below) need to be treated to convert naturally occurring nitrates therein to nitrites. For example, the treatment and conversion can be done using a fermentation process whereby the natural plant component containing high levels of nitrates is incubated with organisms, such as bacteria, under favorable conditions to convert the nitrates in the natural plant component to nitrites.

In one embodiment, the fermentation or other treatment and conversion step is carried out prior to the step of applying the natural plant component to the surface of the fresh meat product. Pre-converted natural plant components, that is, natural plant components in which naturally occurring nitrates therein have already been converted to nitrites ("pre-reacted natural plant components") are commercially available and very suitable for use in association with the inventive method. Alternatively, the fermentation or other treatment and conversion step can be carried out simultaneously with or subsequent to the step of applying the natural plant component to the surface of the fresh meat product. For example, a starting culture can be admixed with a non-reacted natural plant component and the admixture can be applied to the surface of the fresh meat product. The fermentation and conversion occurs on the surface of the fresh meat product.

Examples of natural plant components that can be used include celery, celery extract, carrots, carrot extract, spinach, spinach extract, beets, beet extract and mixtures thereof. These natural plant components contain high levels of nitrates that can easily be converted to nitrites in accordance with the inventive method. Although many other natural plant components can be used, celery and celery extract are very useful due to their relatively high levels of naturally occurring nitrates and the fact they are readily availability in commercial quantities.

The natural plant component can be applied to the entire meat product or merely a surface thereof. As used herein and in the appended claims, a surface of the meat product can mean an entire surface or just a portion of a surface of the meat product. For example, in some cases, it may only be necessary to apply the natural component to the surface of the meat product that is the most visible to consumers after the meat product is sealed in the package.

The natural plant component is applied to the surface of the fresh meat product in an amount sufficient to impart a sufficient amount of nitrites to the fresh meat product to convert myoglobin in the fresh meat product to nitrosomyoglobin and thereby improve the color of the fresh meat product. The amount needed will depend, for example, on the particular natural plant component utilized, the manner in which the natural plant component is applied to the surface of the fresh meat product and the degree of color improvement desired. The amount of nitrosomyoglobin at the surface of the fresh meat product should increase proportionately with the amount of nitrite exposure. As the nitrosomyoglobin content increases, the color of the fresh meat product should improve. The color improvement will maximize when the myoglobin content at the meat surface is completely converted to nitrosomyoglobin.

For example, in one embodiment, the natural plant component is applied to the surface of the fresh meat product in an amount sufficient to impart in the range of from about 0.1 parts per million nitrites to about 100 parts per million nitrites, based on the total parts of the fresh meat product, to the fresh meat product. In another embodiment, the natural plant component is applied to the surface of the fresh meat product in an amount sufficient to impart in the range of from about 1 part per million nitrites to about 10 parts per million nitrites, based on the total parts of the fresh meat product, to the fresh meat product.

The natural plant component can be applied to the surface of the fresh meat product by a variety of techniques. For example, the natural plant component can be ground up into a powder and sprinkled or rubbed (dry rubbed) onto the surface of the meat product.

In one embodiment, the natural plant component is applied to a surface of the fresh meat product by admixing the natural source of nitrites in a base liquid to form a meat color improvement solution, and applying the meat color improvement solution to the surface. Depending on what it is, the natural plant component may dissolve, in whole or in part, in the base liquid or may be merely suspended therein. Thus, as used herein and in the appended claims, the terms "solution," "aqueous solution" and "meat color improvement solution" include true solutions, partial solutions and mere mixtures. For example, the meat color improvement solution may be in the form of a wet rub, paste, emulsion, marinade, glaze or batter.

The base liquid can be any liquid that does not negatively impact the quality of the meat product or the safety thereof. In one embodiment, the base liquid consists essentially of water thereby making the meat color improvement solution an aqueous solution. In another embodiment the base liquid consists of water.

The natural plant component is admixed in the base liquid in an amount sufficient to impart in the range of from about 10 parts per million nitrites to about 10,000 parts per million nitrites, based on the total parts of the meat color improvement solution, to the meat color improvement solution. In one embodiment, the natural plant component is admixed in the base liquid in an amount sufficient to impart in the range of from about 100 parts per million nitrites to about 1,000 parts per million nitrites, based on the total parts of the meat color improvement solution, to the meat color improvement solution. It has been found that nitrite concentrations in the above ranges significantly improve the color of the fresh meat product. The specific nitrite concentration utilized will depend on, for example, the nature of the fresh meat product and the degree of color improvement desired. The higher the concentration of nitrites in the meat color improvement solution, the higher the concentration of nitrites that is placed in contact with the surface of the fresh meat product when the meat color improvement solution is applied thereto. The higher the concentration of nitrites placed in contact with the surface of the meat color improvement solution, the higher the conversion of myoglobin in the fresh meat to nitrosomyoglobin and the greater the improvement the color of the fresh meat product achieved (until the myoglobin content at the meat surface is completely converted to nitrosomyoglobin, as discussed above). As used herein and in the appended claims, "nitrites" refers to nitrite ($NO_2$) ions. For example, the nitrites can be derived from various salts of nitrous acid, including sodium nitrite ($NaNO_2$).

The specific weight or volume percent of the natural plant component to be admixed in the base liquid to achieve the desired parts of the natural plant component per million parts of the meat color improvement solution will depend on the specific natural plant component utilized and the form thereof. By way of illustration, commercially available celery extract in dry powder form is typically admixed in the base liquid in an amount in the range of from about 0.10% by weight to about 30% by weight, based on the total weight of the meat color improvement solution. In one embodiment, commercially available celery extract in dry powder form is admixed in the base liquid in an amount in the range of from about 0.10% by weight to about 10% by weight, based on the total weight of the meat color improvement solution. In another embodiment, commercially available celery extract in dry powder form is admixed in the base liquid in an amount in the range of from about 1% by weight to about 10% by weight, based on the total weight of the meat color improvement solution.

Different sources or lots of natural plant components typically contain varying levels of nitrates or nitrites. If desired, the natural plant component(s) utilized can be combined from a variety of sources and/or production lots in order to provide a natural plant component that will yield consistent levels of nitrates or nitrites and therefore help ensure color consistency.

The meat color improvement solution can be applied to the surface of the fresh meat product by a variety of techniques. For example, the meat color improvement solution can be applied to the surface of the fresh meat product by spraying the solution onto the surface. The meat color improvement solution can also be applied to the surface of the meat product by dipping the meat product into the solution.

It has been determined that dipping a fresh meat product in the meat color improvement solution used in the inventive method will typically result in about a 1% increase in the total weight of the meat product. Assuming that the natural plant component is admixed or dissolved in the meat color improvement solution in a homogenous manner, the concentration of nitrites in the portion of the solution retained on the surface of the meat product will be the same as the concentration of nitrites in the meat color improvement solution into which the meat product is dipped. Based on the 1% increase in the weight of the fresh meat product, it can be assumed that the final nitrite concentration in the fresh meat product as a whole following exposure to the meat color improvement solution will be approximately 1% of the nitrite concentration in the meat color improvement solution. Thus, if the nitrite concentration in the meat color improvement solution is 500 ppm, based on the total weight of the meat color improvement solution, and dipping the fresh meat product in the meat color improvement solution results in about a 1% increase in the total weight of the meat product, it can be assumed that the nitrite concentration with respect to the meat product as a whole is approximately 5 ppm, based on the total weight of the meat product.

One problem that can sometimes be associated with the use of nitrites to improve the surface color of fresh meat products is a persistent internal pinking color of the meat upon cooking. This is a result of diffusion of the nitrites into the interior portions of the meat product. The extent of the internal pinking effect is directly associated with the amount of nitrites present on the surface of the meat.

In order to address the persistent internal pinking color, the meat color improvement solution can include a diffusion mitigation agent for mitigating diffusion of the nitrites into the interior of the fresh meat product. In one embodiment, the diffusion mitigation agent increases the viscosity of the meat color improvement solution which makes the solution more resistant to flow and thereby mitigates penetration of the nitrites to the meat interior. Use of the diffusion mitigation agent lowers the concentration of nitrites that must be utilized without sacrificing the improvement in surface color achieved. For example, the increased viscosity helps hold the meat color improvement solution on the surface of the meat product with respect to the package which allows more nitrites to bind to myoglobin on the surface of the meat product thereby increasing the red color development achieved with a given amount of nitrites. By reducing the concentration of nitrites needed to achieve the desired effect, the internal diffusion of nitrites into the meat product is mitigated.

In one embodiment, the meat color improvement solution comprises in the range of from about 0.001% to about 10% by weight, based on the total weight of the solution, of the diffusion mitigation agent. In another embodiment, the solution comprises in the range of from about 0.005% to about 5% by weight, based on the total weight of the solution, of the diffusion mitigation agent. In yet another embodiment, the solution comprises in the range of from about 0.05% to about 5% by weight, based on the total weight of the solution, of the diffusion mitigation agent. Examples of meat diffusion agents that can be utilized include xanthan gum, hydrocolloids, starches and mixtures thereof. Xanthan gum is particularly suitable because it imparts a consistent viscosity to the solution and is effective at relatively low concentrations thereby lessening the chance for an auxiliary flavor or other negative impact on the quality of the meat product.

The diffusion mitigation agent can be admixed with the base liquid before or after the natural plant component is admixed therein. In one embodiment, the diffusion mitigation agent is admixed with the base liquid after the natural plant component is admixed therein to assure that the natural plant component is evenly dispersed or dissolved in the base liquid.

The low oxygen environment can be obtained by vacuum packaging, modified atmosphere packaging (MAP) or any packaging method that can create a low oxygen environment in the package. Vacuum packaging in accordance with the inventive method comprises removing all or substantially all of the gases, including oxygen, from the package before the package is sealed. In one embodiment in which vacuum packaging is used in accordance with the inventive method, the fresh meat product is sealed in the package in a manner such that the atmospheric pressure in the package is in the range of from about zero mbar to about 20 mbar. In another embodiment in which vacuum packaging is used in accordance with the inventive method, the fresh meat product is sealed in the package in a manner such that the atmospheric pressure in the package is in the range of from about zero mbar to about 10 mbar.

Modified atmosphere packaging in accordance with the inventive method comprises replacing the air in the package with a different gas or gas combination amounting to a low oxygen environment prior to sealing the package. For example, the gas or gas combination substituted for the air in the modified atmosphere packaging process used in accordance with the inventive method can consist essentially of either nitrogen or a mixture of nitrogen and carbon dioxide (for example, 70% nitrogen and 30% carbon dioxide). For example, the fresh meat product can be sealed in the modified air packaging in a manner such that the atmospheric pressure in the package is in the range of from about 5 mbar to about 20 mbar.

In addition to controlling the amount of oxygen in the package by removing or modifying the atmosphere therein, a low oxygen environment in accordance with the inventive method can be created by using oxygen scavengers and/or antioxidants. By tying up oxygen in the package, such components prevent the oxygen molecules from out-competing the nitrites for the available binding sites on the myoglobin molecule.

In one embodiment, in addition to having a low oxygen content, the gas or gas combination utilized in a modified atmosphere packaging process in accordance with the inventive method also has a low level of carbon monoxide. Carbon monoxide can compete with the nitrous oxide for myoglobin binding. As will be understood by those skilled in the art, minimizing or excluding carbon monoxide from the package can be advantageous in other respects as well.

The inventive meat color improvement solution for improving the color of a fresh meat product comprises a base liquid, a natural plant component present in the base liquid, and a diffusion mitigation agent present in the base liquid as described above. The various components and aspects of the inventive meat color solution are the same as described above in connection with the inventive method.

For example, in one embodiment, the inventive meat color improvement solution comprises a base liquid consisting essentially of water, a natural plant component present in said solution in an amount sufficient to impart in the range of from about 10 parts per million nitrites to about 10,000 parts per million nitrites, based on the total parts of said meat color improvement solution, to said meat color improvement solution, and in the range of from about 0.001% to about 10% by weight, based on the total weight of the solution, of the diffusion mitigation agent.

The inventive pre-packaged food product comprises a fresh meat product that has been treated with the inventive meat color improvement solution and a package containing the fresh meat product in a low oxygen environment.

Figure 1B:
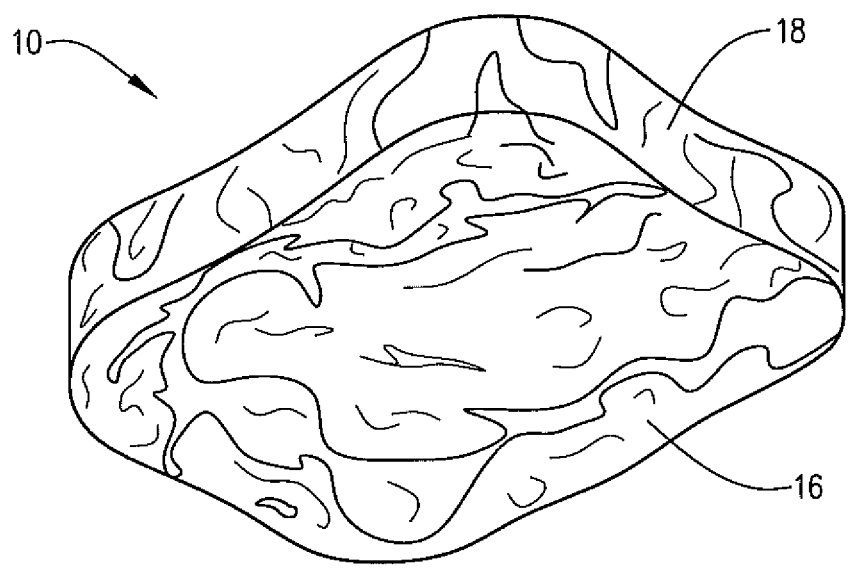
FIG. 1B is a reverse perspective view of the fresh beef strip loin shown by FIG. 1A illustrating the bottom and opposing side portion thereof.

Referring now to the drawings, the inventive pre-packaged food product, generally designated by the reference numeral 20, will be described. FIGS. 1A and 1B illustrate a fresh beef strip loin 10 to be treated with the inventive meat color improvement solution in accordance with the inventive method. The fresh beef strip loin 10 comprises an interior 12 (see FIGS. 2B and 3B), a top surface 14, a bottom surface 16 opposing the top surface, and a side surface 18 connecting the top surface and bottom surface together. The fresh beef strip loin 10 is then treated with the inventive meat color improvement solution and packaged in accordance with the inventive method, as described above, to form the inventive pre-packaged food product 20.

FIGS. 2A and 2B illustrate one embodiment of the pre-packaged food product 20. In this embodiment, the pre-packaged food product 20 is formed in accordance with the inventive method using a vacuum packaging technique and includes the fresh beef strip loin 10, which has been treated with the inventive meat color improvement solution, and a vacuum package 30. The strip loin 10 is sealed in the vacuum package 30 whereby the vacuum package 30 maintains the strip loin in a low oxygen environment.

The vacuum package 30 comprises an interior 32, a top section 34, a bottom section 36 and a side section 38 connecting the top section and bottom section together. Each of the top, bottom and side sections 34, 36 and 38, respectively, include an interior surface 40 and an exterior surface 42. All of the sections 34, 36 and 38 of the package 30 are clear, allowing the consumer to view all surfaces of the strip loin 10 as packaged therein. The bottom section 36 of the package 30 includes an extension portion 46 that facilitates removal of the bottom section from the remainder of the package 30 allowing easy access to the strip loin 10.

As shown by FIG. 2B, prior to vacuum sealing the fresh beef strip loin 10 in the package 30, the surfaces 14, 16 and 18 of the strip loin are treated with the inventive meat color improvement solution in accordance with the inventive method. As a result, a layer 50 of the meat color improvement solution is disposed on the surfaces 14, 16 and 18 of the strip loin 10 between the surfaces and the interior surfaces 40 of the top, bottom and side sections 34, 36 and 38 of the package 30. Due to the vacuum packaging technique, the package 30 is wrapped tightly around the strip loin 10 which helps hold the layer 50 of the meat color improvement solution in contact with the surfaces 14, 16 and 18 of the strip loin 10.

Figure 3A:
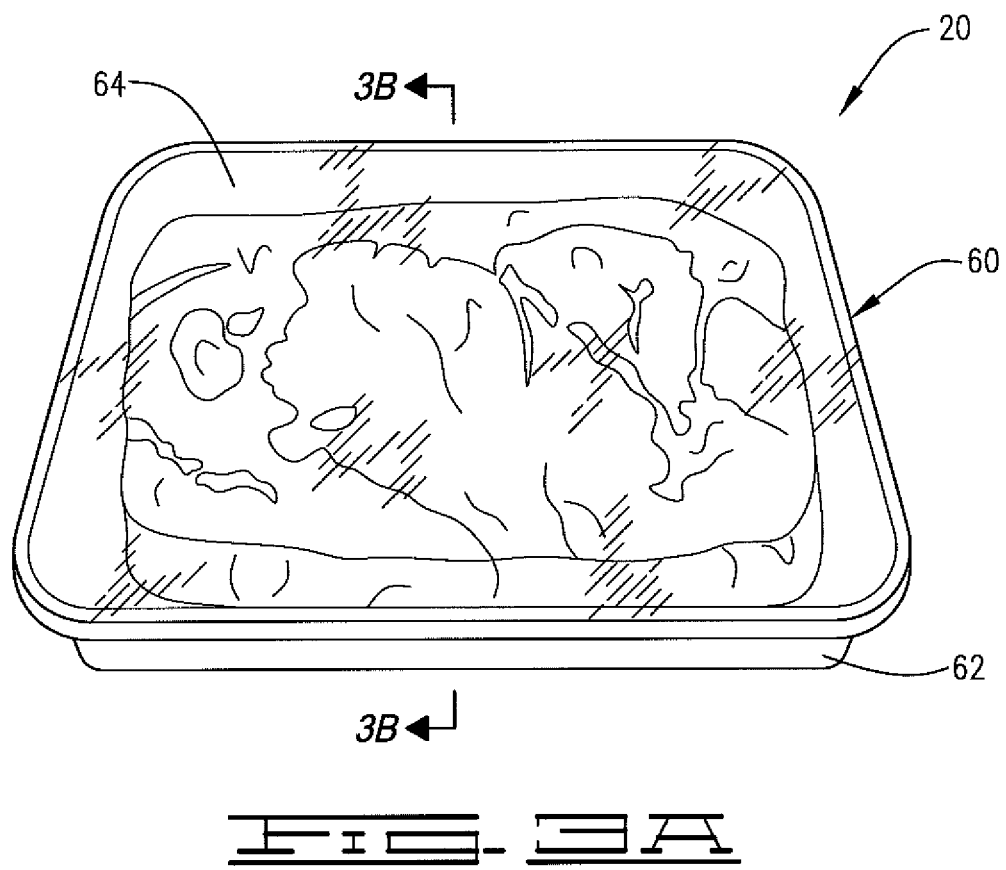
FIG. 3A is a perspective view of the inventive pre-packaged food product, namely the fresh beef strip loin shown by FIGS. 1A and 1B as packaged in accordance with the inventive method using a vacuum packaging technique.
Figure 3B:
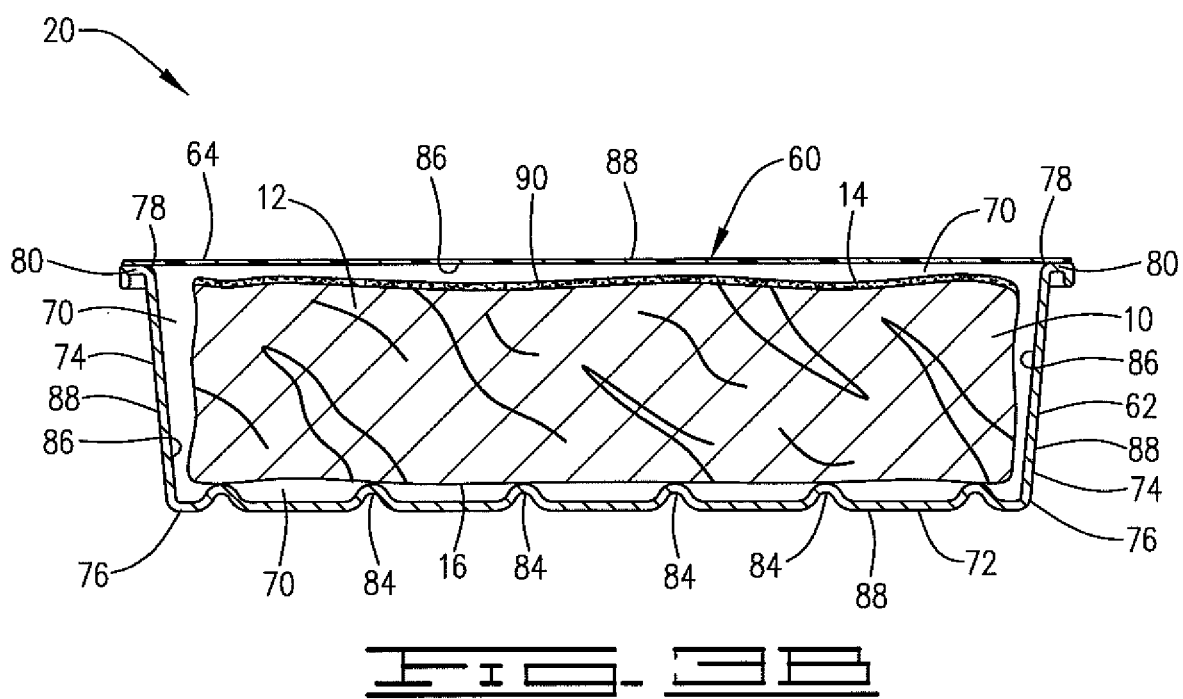
FIG. 3B is a cross-sectional view taken along line 3B of FIG. 3A.

FIGS. 3A and 3B illustrate another embodiment of the pre-packaged food product 20. In this embodiment, the pre-packaged food product 20 is formed in accordance with the inventive method using a modified air packaging technique and includes the fresh beef strip loin 10, which has been treated with the inventive meat color improvement solution, and a modified air package 60. The strip loin 10 is sealed in the modified air package 60 whereby the modified air package maintains the strip loin in a low oxygen environment.

The package 60 includes a tray 62 and a corresponding top 64. The tray 62 includes an interior 70, a bottom section 72 and a side section 74. The side section 74 includes a lower end 76 attached to the bottom section 72 and an opposing upper end 78. The upper end 78 of the side section 74 includes a lip 80 to which the top 64 can be attached. The top 64 is attachable to the lip 80 in a manner that seals the strip loin 10 within the interior 70 of the modified air package 60. The bottom section 72 of the tray 62 is corrugated and includes a plurality of ribs 84 which function to partially hold the strip loin 10 off the bottom section and thereby allow most of the bottom surface 16 of the strip loin 10 to remain in contact with the modified air in the package 60 and the inventive meat color improvement solution (if desired).

Each of the tray 62 and top 64 of the package 60 include an interior surface 86 and an exterior surface 88. The top 64 of the package 60 is clear allowing the consumer to view the top surface of the strip loin 10 even after the top is sealed to the tray 62. The tray 62 is not clear.

As shown by FIG. 3B, prior to sealing the fresh beef strip loin 10 in the package 60, the top surface 14 of the strip loin is treated with the inventive meat color improvement solution in accordance with the inventive method. As a result, a layer 90 of the meat color improvement solution is disposed on the top surface 14 of the strip loin 10. The top 64 is attached to the lip 80 of the upper end 78 of the tray 62 thereby sealing the strip loin 10 in the package 60. Using modified air packaging techniques, the air in the sealed package 60 is replaced with a modified atmosphere as discussed above.

Due to the fact that the top 64 is clear and the tray 62 is not clear, the top surface 14 of the fresh beef strip loin 10 will be the most visible to consumers when the pre-packaged food product 20 is displayed. As a result, it is only necessary to treat the top surface 14 with the inventive meat color improvement solution. Alternatively, all of the surfaces 14, 16 and 18 of the fresh beef strip loin 10 can treated with the meat color improvement solution even though the tray is not clear. This will improve the appearance of the overall strip loin 10 to the consumer even upon removal of the strip loin from the package 60.

In order to further illustrate the invention, the following examples and test data are provided.

EXAMPLE 1

Objective

The objective of this study was to assess the impact of the inventive method and meat color improvement solution in packaging fresh beef strip loins. The natural plant component utilized in the tests was pre-reacted celery powder. The fresh meat products utilized in the tests were fresh beef strip loins. The strip loins were packaged in accordance with the inventive method utilizing a vacuum packaging technique.

Methodology

Three fresh beef strip loins were each serially cut into 12 one inch thick steaks (test steaks). The following two solutions were prepared:

Test Solution A: an aqueous solution prepared by admixing celery powder in water. The amount of celery powder present in the solution was 10% by weight, based on the total weight of the solution.

Test Solution B: an aqueous solution prepared by admixing pre-reacted celery powder (celery powder that had been fermented) in water. The amount of pre-reacted celery powder present in the solution was 10% by weight, based on the total weight of the solution.

Twelve of the test steaks were then placed directly in high barrier bags and vacuum-packaged therein (control test steaks). Two groups of twelve test steaks were dipped in either Test Solution A (n=12) or Test Solution B (n=12), placed in high barrier bags and vacuum-packaged therein.

A total of 6 test steaks per group (control, Test Solution A, Test Solution B) were stored under dark conditions at 32-34° F. for 5 days and the additional 6 test steaks per group were stored under similar dark conditions for 12 days. After the 5 or 12 day dark storage period, test steaks were removed from dark storage and placed in a lighted retail display case for an additional 0 to 16 days (if in the 5 day dark group) or an additional 0 to 6 days (if in the 12 day dark group).

Chemical analyses for nitrate and nitrite of Test Solution A and Test Solution B were carried out. Test Solution A comprised total nitrate and nitrite levels of 1,507 ppm and <0.01 ppm, respectively. Test Solution B comprised total nitrate and nitrite levels of 1.10 ppm and 1,056 ppm, respectively. Dipping the test steaks in the solutions resulted in an approximately 1% increase in the total weight of each steak. Based on this increase, it can be assumed that the final nitrate and nitrite concentrations in each test steak as a whole were approximately 1% of the nitrate and nitrite concentrations in the test solutions. Thus, for example, based on this analysis, it can be assumed that the test steaks treated with Test Solution B had a total final nitrite level of approximately 10.56 ppm.

Instrumental color tests were then carried out each day post-dark storage by testing three locations on each test steak. A HunterLab MiniScan colorimeter was utilized to assess instrumental color. Color data obtained was a* (redness; 60=red, −60=green), and b* (yellowness; 60=yellow, −60=blue), to objectively determine color differences amongst treatments.

Results

Figure 4:
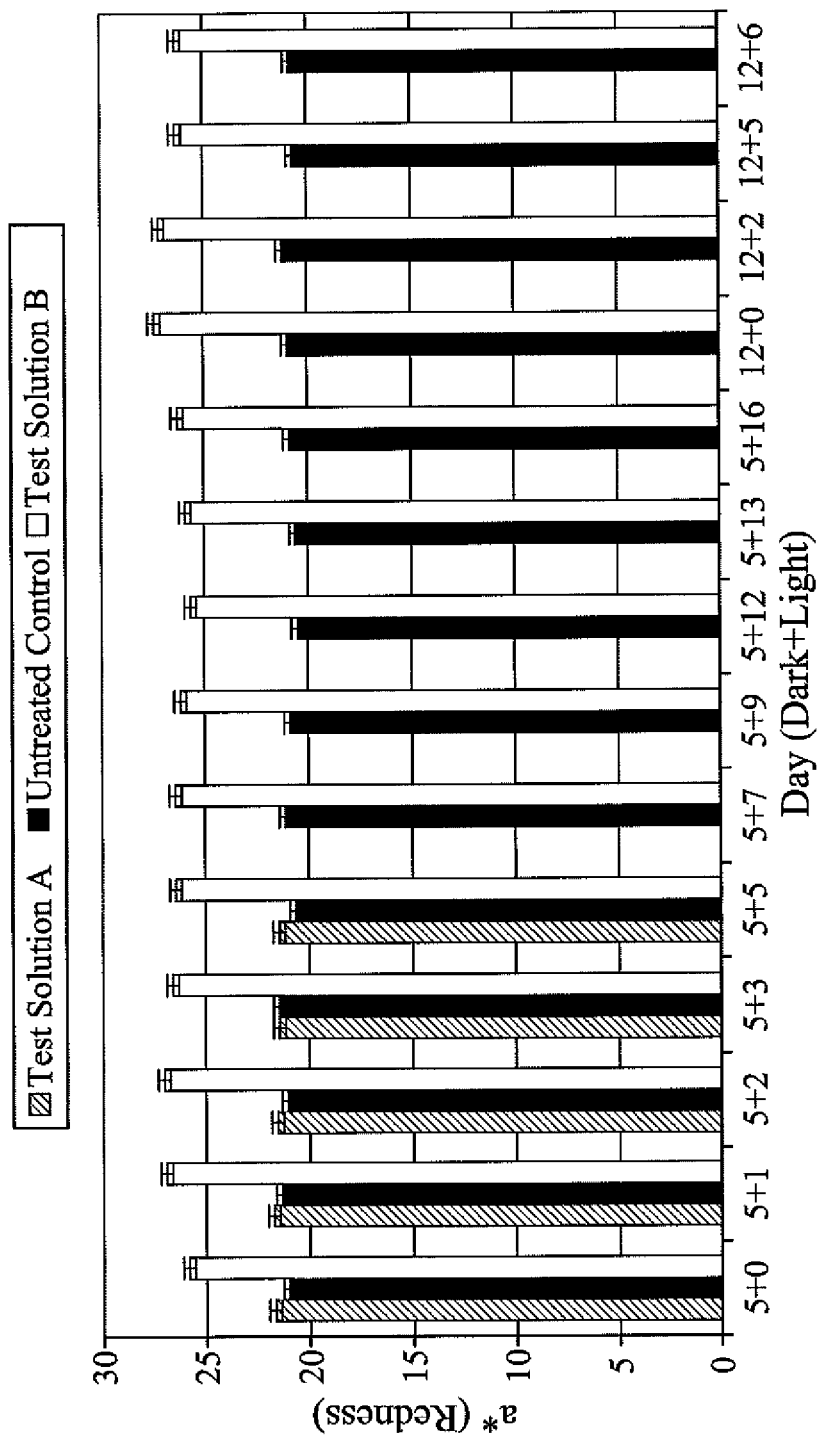
FIGS. 4 and 5 correspond to Example 1 below and depict the results for instrumental a* (redness) and b* (yellowness) values, respectively.
Figure 5:
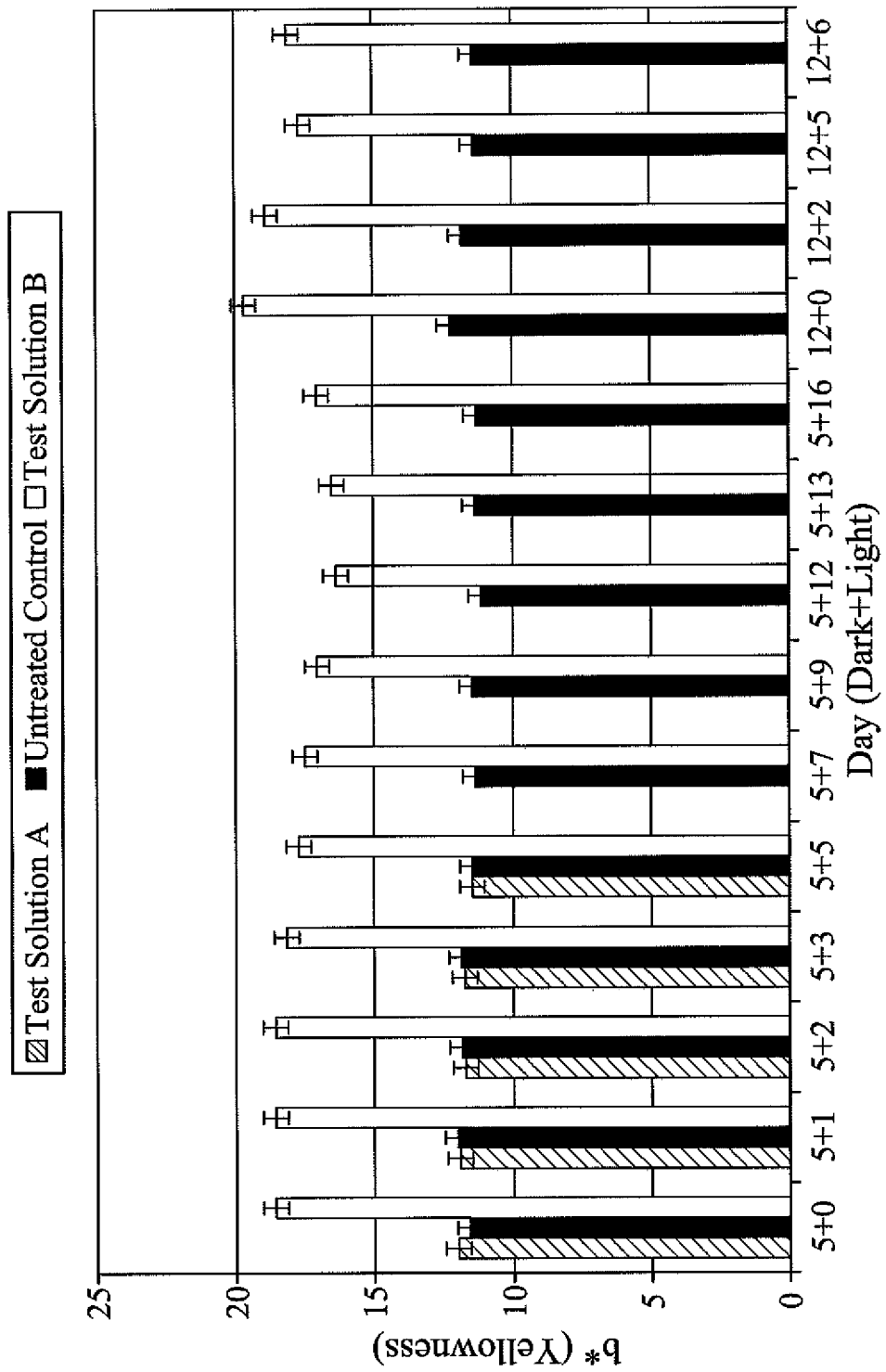

FIGS. 4 and 5 of the drawings depict the results for instrumental a* (redness) and b* (yellowness) values, respectively. There were no differences between the test steaks dipped in Test Solution A and the untreated controls under vacuum through day 10 (5 dark+5 light) for a* or b* values. It should be noted that because of the lack of differences in color by day 10 from packaging, instrumental color was not assessed on the test steaks dipped in Test Solution A thereafter. The test steaks dipped in Test Solution B were redder (higher a*) and yellower (higher b*) than the remaining test steaks throughout the study. This indicates that the pre-reacted celery powder effectively produced a steak that was red in appearance and that redness was retained through 18 days from packaging.

EXAMPLE 2

Objective

The objective of this study was to assess the effect of various solution concentrations of pre-reacted celery powder on color development in beef strip loin steaks under vacuum packaging.

Methodology

Fresh beef strip loins (n=4) were each serially cut into 12 one inch thick steaks (test steaks). The following three solutions were prepared:

Test Solution A: an aqueous solution prepared by admixing pre-reacted celery powder in water. The amount of celery powder present in the solution was 2.5% by weight, based on the total weight of the solution.

Test Solution B: an aqueous solution prepared by admixing pre-reacted celery powder in water. The amount of pre-reacted celery powder present in the solution was 5% by weight, based on the total weight of the solution.

Test Solution C: an aqueous solution prepared by admixing pre-reacted celery powder in water. The amount of pre-reacted celery powder present in the solution was 10% by weight, based on the total weight of the solution.

Twelve of the test steaks were placed directly in high barrier bags and vacuum-packaged therein (control test steaks). Three sets of twelve test steaks were first dipped in either Test Solution A (n=12), Test Solution B (n=12) or Test Solution C (n=12), placed in high barrier bags and vacuum-packaged therein.

A total of 6 test steaks per group (control, Test Solution A, Test Solution B, Test Solution C) were stored under dark conditions at 32-34° F. for 4 days and the additional 6 test steaks per group were stored under similar dark conditions for 11 days. An additional test group was analyzed after 18 days of dark storage. After the 4, 11 or 18 day dark storage period, test steaks were removed from dark storage and placed in a lighted retail display case for an additional 0 to 12 days (if in the 4 day dark group), an additional 0 to 6 days (if in the 11 day dark group) or an additional 3 days for the 18 day dark group.

Chemical analyses for nitrate and nitrite of Test Solution A and Test Solution B were carried out. Test Solution A comprised total nitrate and nitrite levels of 24 ppm and 263 ppm, respectively. Test Solution B comprised total nitrate and nitrite levels of 44 ppm and 593 ppm, respectively. Test Solution C comprised total nitrate and nitrite levels of 81 ppm and 1260 ppm, respectively. Dipping the test steaks in the solutions resulted in an approximately 1% increase in the total weight of each steak. Based on this increase, it can be assumed that the final nitrate and nitrite concentrations in each test steak as a whole were approximately 1% of the nitrate and nitrite concentrations in the test solutions. Thus, for example, based on this analysis, it can be assumed that the test steaks treated with Test Solution B had a total final nitrite level of approximately 5.93 ppm.

Instrumental color tests were then carried out each day post-dark storage by testing three locations on each test steak. A HunterLab MiniScan colorimeter was utilized to assess instrumental color. Color data obtained was a* (redness; 60=red, −60=green), and b* (yellowness; 60=yellow, −60=blue), to objectively determine color differences amongst treatments.

Results

Figure 6:
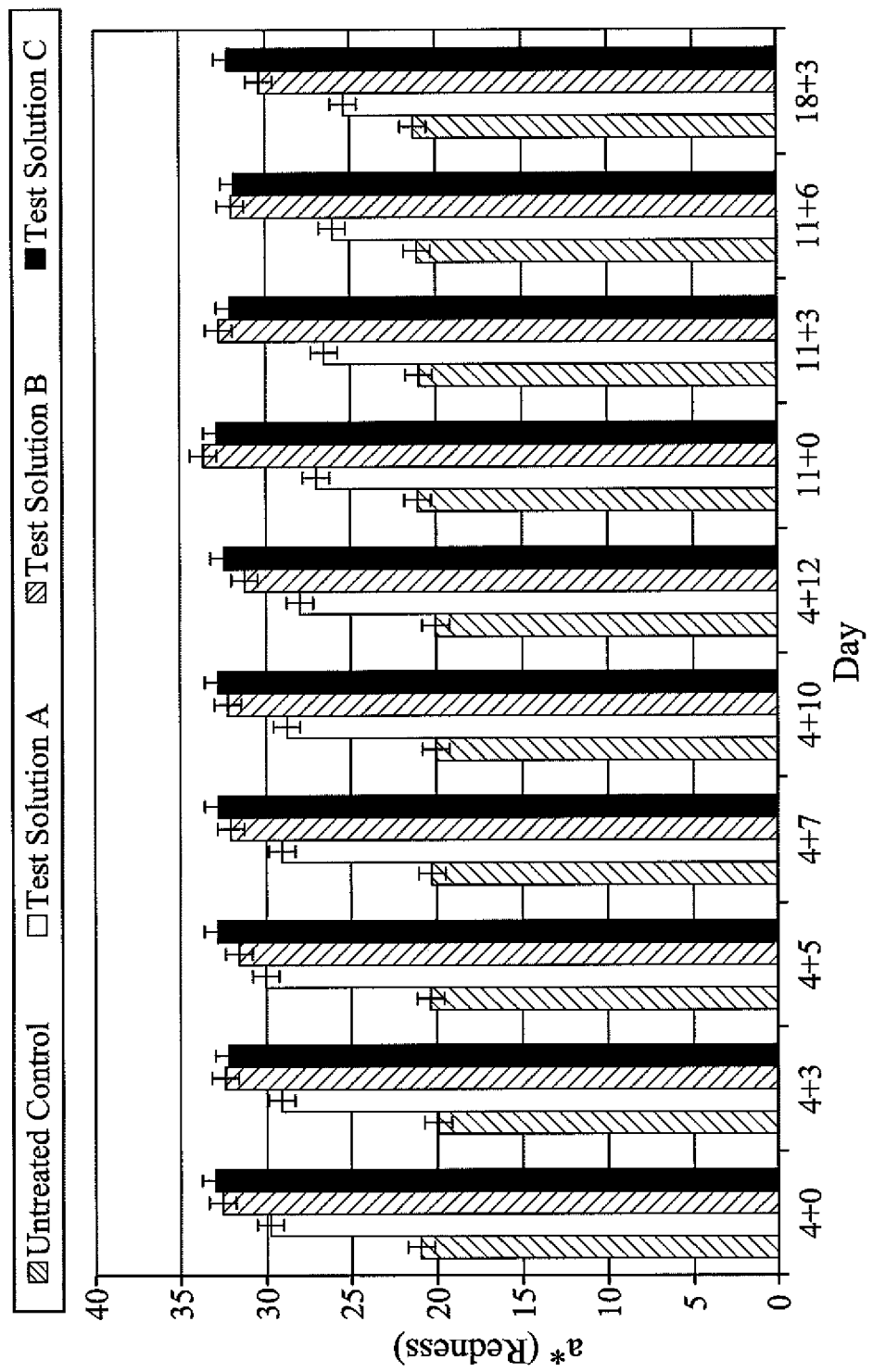
FIGS. 6 and 7 correspond to Example 2 below and depict the results for instrumental a* (redness) and b* (yellowness) values, respectively.
Figure 7:
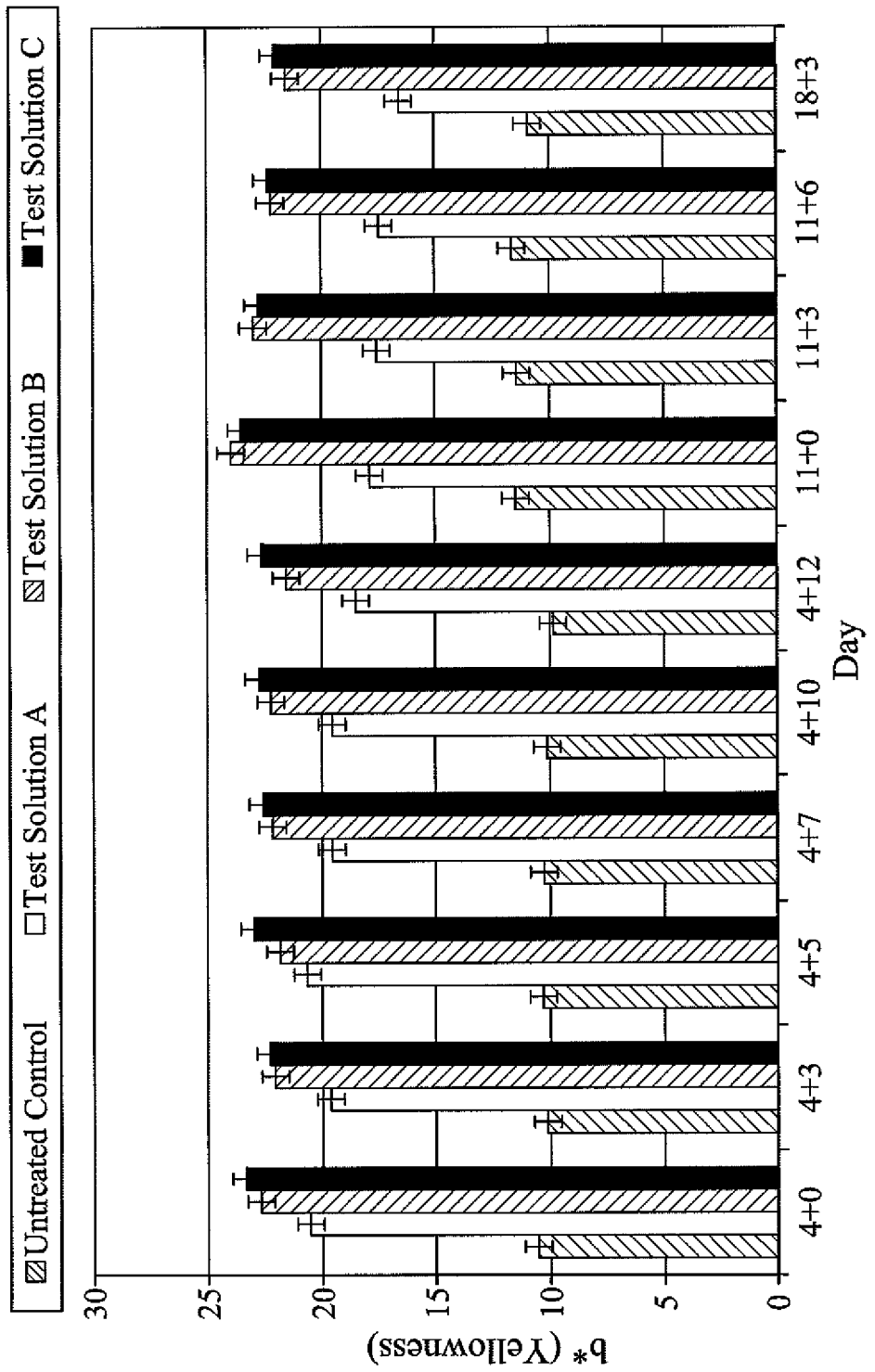

FIGS. 6 and 7 of the drawings depict the results for instrumental a* (redness) and b* (yellowness) values, respectively. Untreated Control beef strip steaks had consistently lower color values across shelf life days assessed. Test Solution A-treated steaks, while having redder and yellower color than Untreated Control steaks, were less red and less yellow than Test Solution B or Test Solution C-treated steaks. Test Solutions B and C-treated steaks were generally similar in redness and yellowness across the days analyzed. This would indicate that Test Solution A did improve color compared to Untreated Control steaks, but was not sufficient in concentration to elicit the greater color improvement of Test Solution B and Test Solution C.

EXAMPLE 3

Objective

The objective of this study was to determine whether the addition of xanthan gum (XG) to the pre-reacted celery solution modified the surface color effects in vacuum-packaged beef strip steaks.

Methodology

Fresh beef strip loins (n=7) were each serially cut into 12 one inch thick steaks (test steaks). The following six test solutions were prepared:

Test Solution A: an aqueous solution prepared by admixing pre-reacted celery powder in water. The amount of celery powder present in the solution was 2.5% by weight, based on the total weight of the solution.

Test Solution B: an aqueous solution prepared by admixing pre-reacted celery powder and xanthan gum in water. The amount of celery powder present in the solution was 2.5% by weight, based on the total weight of the solution. The amount of xanthan gum present in the solution was 1.0% by weight, based on the total weight of the solution.

Test Solution C: an aqueous solution prepared by admixing pre-reacted celery powder in water. The amount of pre-reacted celery powder present in the solution was 5% by weight, based on the total weight of the solution.

Test Solution D: an aqueous solution prepared by admixing pre-reacted celery powder and xanthan gum in water. The amount of celery powder present in the solution was 5% by weight, based on the total weight of the solution. The amount of xanthan gum present in the solution was 1.0% by weight, based on the total weight of the solution.

Test Solution E: an aqueous solution prepared by admixing pre-reacted celery powder in water. The amount of pre-reacted celery powder present in the solution was 10% by weight, based on the total weight of the solution.

Test Solution F: an aqueous solution prepared by admixing pre-reacted celery powder and xanthan gum in water. The amount of celery powder present in the solution was 10% by weight, based on the total weight of the solution. The amount of xanthan gum present in the solution was 1.0% by weight, based on the total weight of the solution.

Twelve of the test steaks were placed directly in high barrier bags and vacuum-packaged therein (untreated control test steaks). Six sets of twelve test steaks were first dipped in either Test Solution A (n=12), Test Solution B (n=12), Test Solution C (n=12), Test Solution D (n=12), Test Solution E (n=12), or Test Solution F (n=12), placed in high barrier bags and vacuum-packaged therein.

A total of 12 test steaks per group (control, Test Solutions A-F) were stored under dark conditions at 32-34° F. for 12 days. Following the 12 day dark storage period, test steaks were removed from dark storage and placed in a lighted retail display case for an additional 0 to 6 days.

Instrumental color analysis was performed in a manner similar to that described with respect to Examples 1 and 2.

Results

Figure 8:
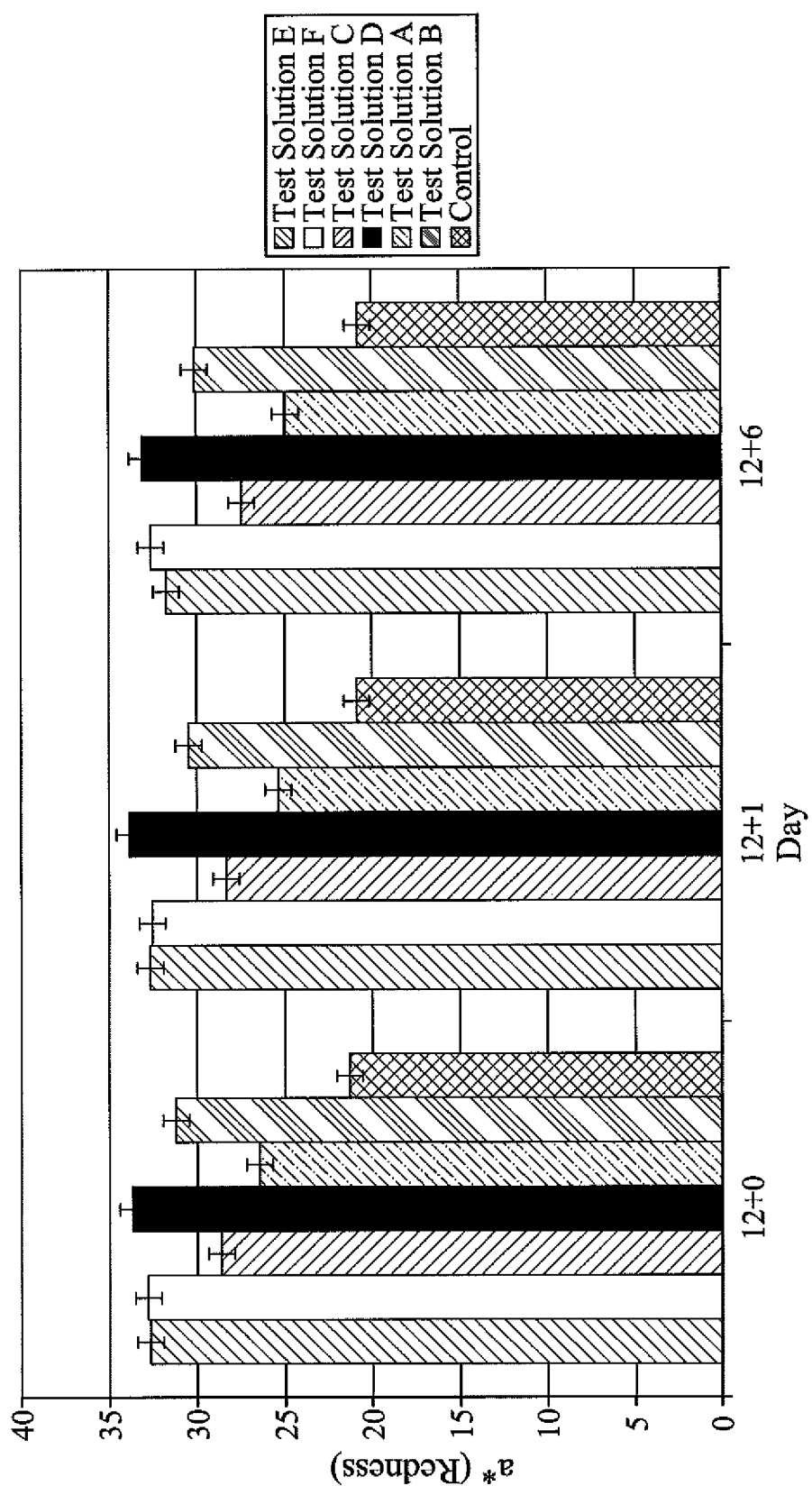
FIGS. 8 and 9 correspond to Example 3 below and depict the a* and b* values from the study, respectively.
Figure 9:
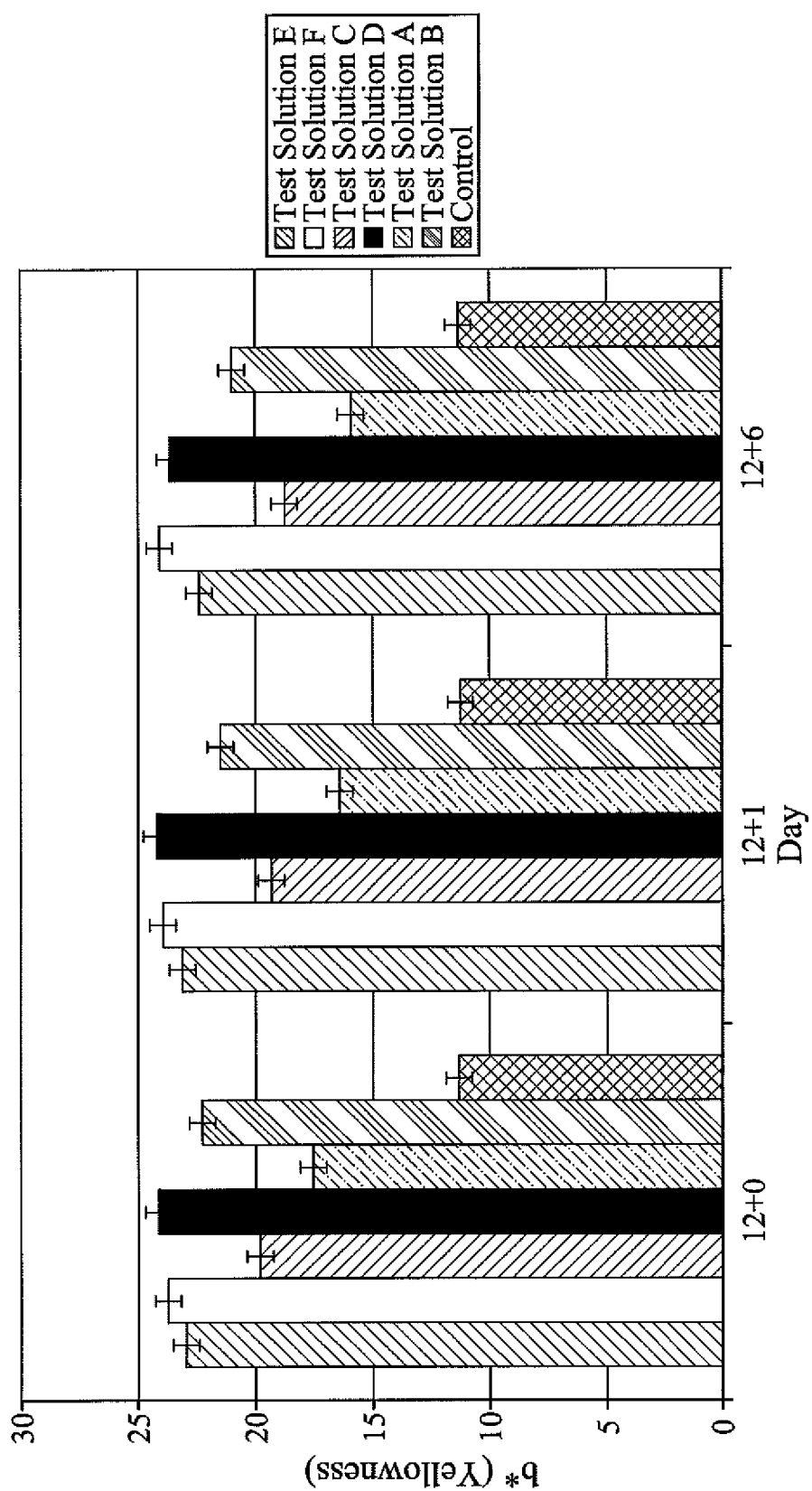

FIGS. 8 and 9 of the drawings depict the a* and b* values from the study, respectively. The results indicate that Test Solution B had greater redness and yellowness than Test Solution C. Additionally, while not similar on every date interval, Test Solution B treated steaks were similar or approaching similar redness and yellowness to Test Solution E treated steaks. These results indicate that xanthan gum incorporated into the pre-reacted celery solutions allows for better color development and retention with lower concentrations of pre-reacted celery (and subsequently nitrite).

EXAMPLE 4

Objective

In Example 3, the results demonstrate that the addition of xanthan gum to the pre-reacted celery solution produces enhanced surface color effects at the lower concentrations of extract. These results suggest that lower concentrations of extract can be utilized without sacrificing surface color thereby mitigating the internal pinking effect associated with high levels of extract. Thus, the objective of this study was to assess the internal cooked color of steak at varying concentrations of pre-reacted celery solution in the presence and absence of xanthan gum.

Methodology

The experimental groups, methods and test solutions are the same as Example 3 except that the meat was only in dark storage for 5 days. Following the 5 day dark storage, the steaks were removed from their respective packages and cooked to an internal temperature of 160° F. Test steaks were then cut and instrumental color analysis performed in triplicate locations on the internal cut surface of four test steaks per experimental group (untreated control and Test Solutions A-F). For this study only a* values are reported, as that was more reflective of persistent pinking impacts on cooked steaks.

Results

Figure 10:
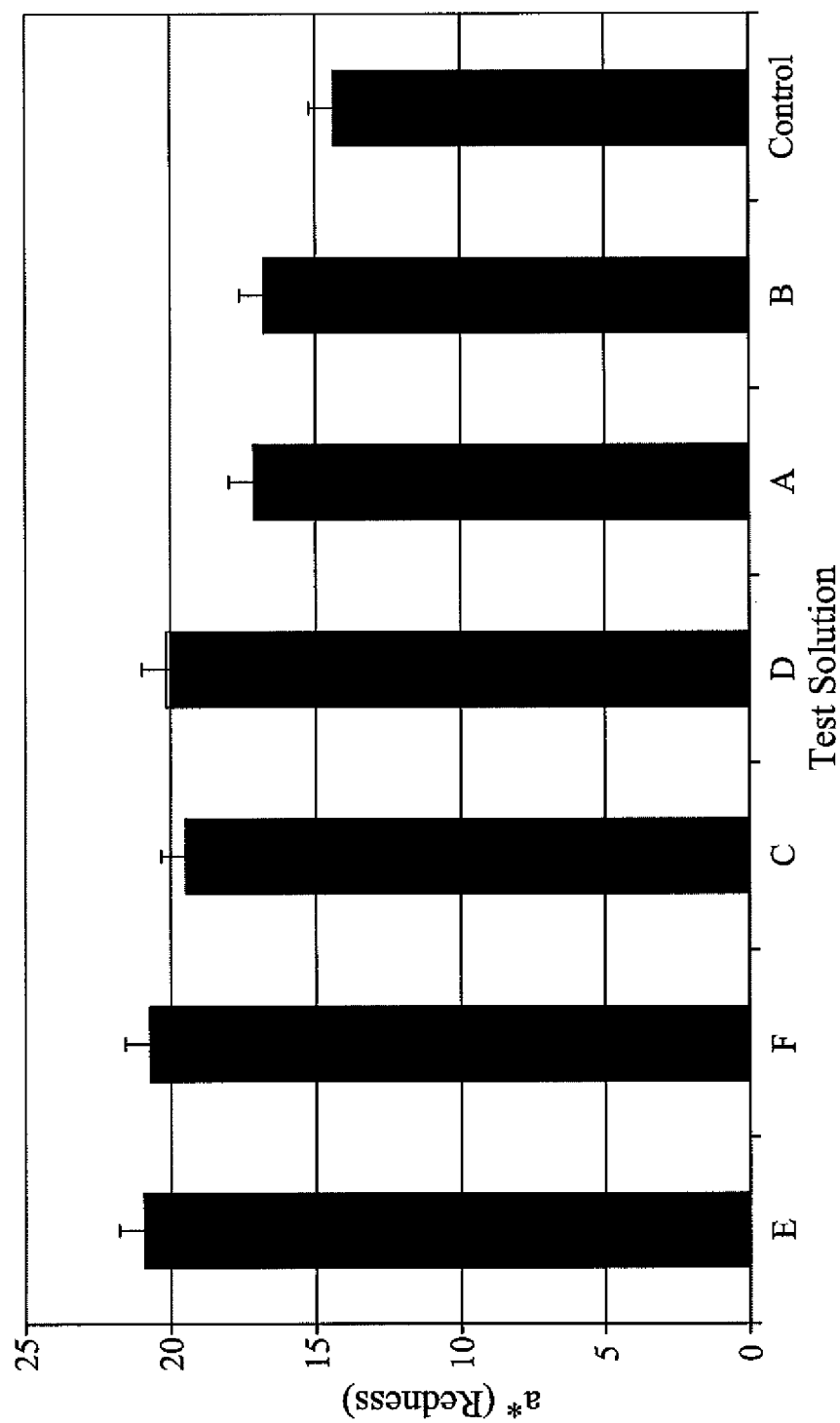
FIG. 10 corresponds to Example 4 below and demonstrates color redness by treatment.

FIG. 10 demonstrates color redness by treatment. Control steaks were significantly less red (hence less pink) than all other treatments. However, Test Solutions A and B treated steaks were significantly less red/pink than the other pre-reacted celery dipped steak treatments. The overall conclusion is that utilizing lower concentrations of pre-reacted celery solution in conjunction with xanthan gum can provide for greater surface red color on raw steaks while utilizing lower levels of nitrites thus mitigating the persistent pinking in cooked steaks.

EXAMPLE 5

Objective

The objective of this study was to assess the duration of the color effect of various solution concentrations of pre-reacted celery powder on beef strip loin steak and beef sirloin steak under vacuum packaging.

Methodology

Fresh beef strip loins (n=3) and fresh beef sirloins (n=3) were each serially cut into 12 one inch thick steaks (test steaks). The following two solutions were prepared:

Test Solution A: an aqueous solution prepared by admixing pre-reacted celery powder in water. The amount of celery powder present in the solution was 3% by weight, based on the total weight of the solution.

Test Solution B: an aqueous solution prepared by admixing pre-reacted celery powder in water. The amount of pre-reacted celery powder present in the solution was 5% by weight, based on the total weight of the solution.

Seven of the test steaks for each cut of meat were placed directly in high barrier bags and vacuum-packaged therein (control test steaks). Two sets of seven test steaks were first dipped in either Test Solution A (n=7) or Test Solution B (n=7), placed in high barrier bags and vacuum-packaged therein. The test steaks were then stored under dark conditions at 32-34° F. for 29 days and instrumental color analysis was performed on days 12, 19, 27 and 29.

Chemical analyses for nitrate and nitrite of Test Solution A and Test Solution B were carried out. Test Solution A comprised total nitrate and nitrite levels of 13 ppm and 152 ppm, respectively. Test Solution B comprised total nitrate and nitrite levels of 28 ppm and 304 ppm, respectively. Dipping the test steaks in the solutions resulted in an approximately 1% increase in the total weight of each steak. Based on this increase, it can be assumed that the final nitrate and nitrite concentrations in each test steak as a whole were approximately 1% of the nitrate and nitrite concentrations in the test solutions. Thus, for example, based on this analysis, it can be assumed that the test steaks treated with Test Solution A had a total final nitrite level of approximately 1.52 ppm.

Instrumental color tests were then carried out by testing three locations on each test steak for each time interval tested. A HunterLab MiniScan colorimeter was utilized to assess instrumental color. Color data obtained was a* (redness; 60=red, −60=green), and b* (yellowness; 60=yellow, −60=blue), to objectively determine color differences amongst treatments.

Results

Figure 11:
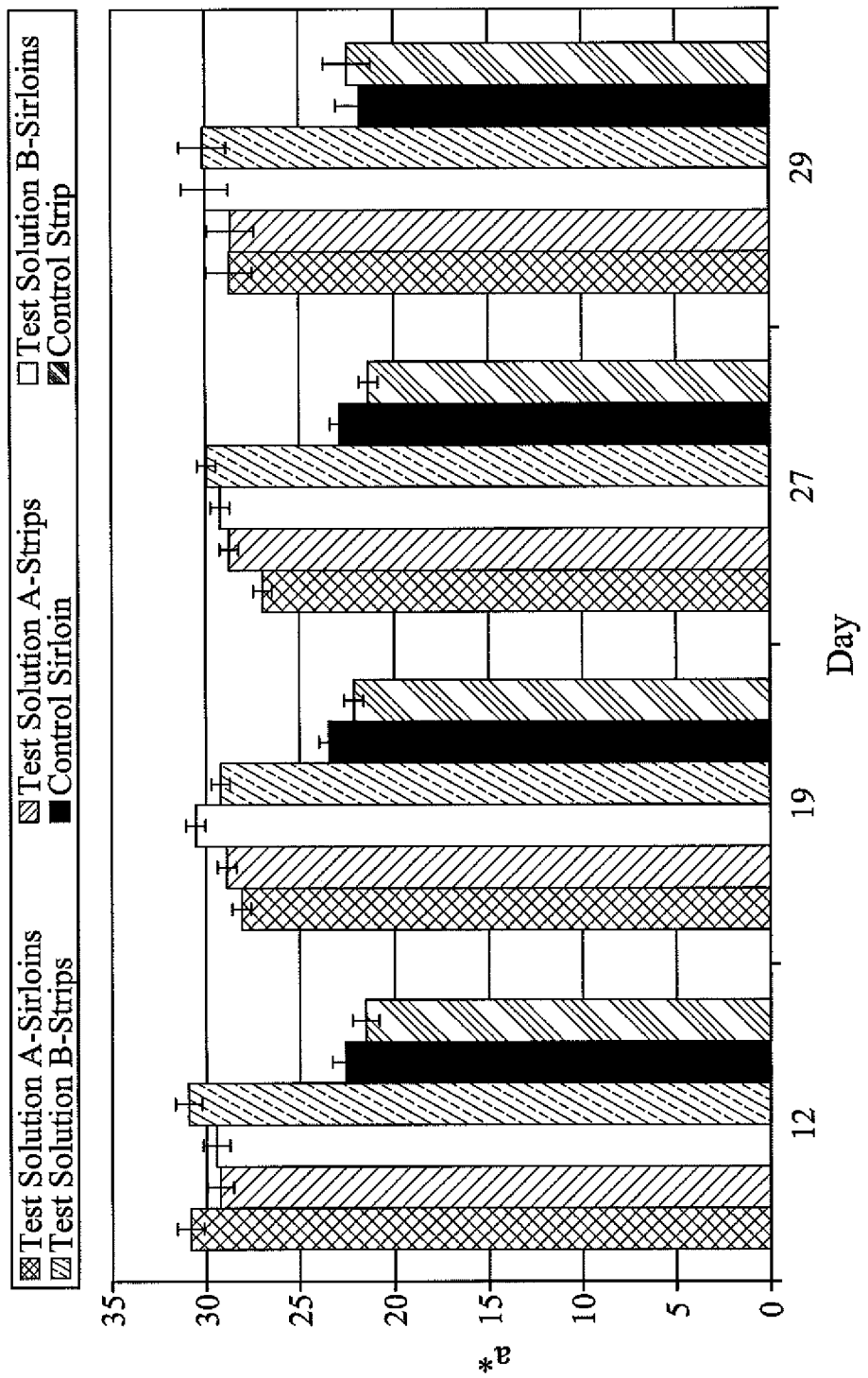
FIGS. 11 and 12 correspond to Example 5 below and represent the results for instrumental a* (redness) and b* (yellowness) values, respectively.
Figure 12:
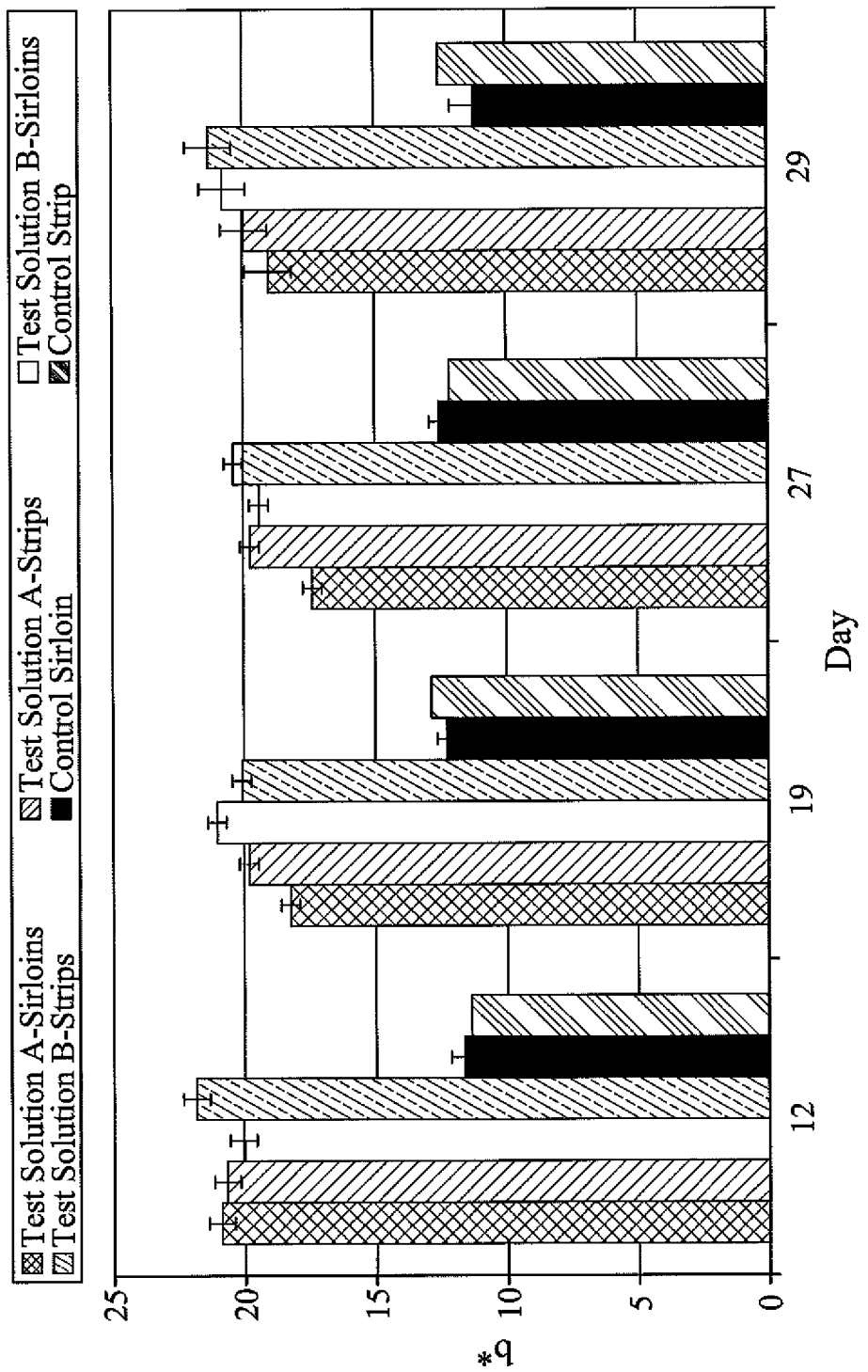

FIGS. 11 and 12 of the drawings represent the results for instrumental a* (redness) and b* (yellowness) values, respectively. Consistent with the previous trials, untreated strip and sirloin steaks were less red and less yellow than Test Solution treatments, indicating a darker color under vacuum. Sirloin and strip steaks dipped in Test Solutions A and B generally had higher a* and b* values as compared to controls. This increase in color persisted for at least 29 days. Thus, these results demonstrate that the current invention provides a fresh meat product that has an extended color duration and thus, an extended shelf life at retail.

EXAMPLE 6

Objective

The objective of this study was to assess the surface color effect of two solution concentrations from two different sources of pre-reacted celery powder on pork loin chops, pork blade steaks, beef sirloin steaks and beef strip steaks under vacuum packaging.

Methodology

Fresh boneless pork loins (n=2), fresh boneless pork butts (n=4) fresh beef top sirloins (n=4), and fresh beef strip loins (n=3) were serially cut into 12 one inch chops/steaks. The following solutions were prepared:

Test Solution A: an aqueous solution prepared by admixing pre-reacted celery powder from source A in water. The amount of celery powder present in the solution was 5% by weight, based on the total weight of the solution.

Test Solution B: an aqueous solution prepared by admixing pre-reacted celery powder from source A in water. The amount of pre-reacted celery powder present in the solution was 10% by weight, based on the total weight of the solution.

Test Solution C: an aqueous solution prepared by admixing pre-reacted celery powder from source B in water. The amount of celery powder present in the solution was 5% by weight, based on the total weight of the solution.

Test Solution D: an aqueous solution prepared by admixing pre-reacted celery powder from source B in water. The amount of pre-reacted celery powder present in the solution was 10% by weight, based on the total weight of the solution.

Test chops/steaks were packaged and treated with the above solutions as described in previous examples. A total of 5 test steaks/chops per group (control, Test Solutions A to D) were stored under dark conditions at 32-34° F. for 4 days and thereafter placed in a lighted retail display case for an additional 0 to 9 days. Instrumental color was assessed on each test steak/chop at 1, 2, 3, 6, 7, 8 and 9 days post placement in the lighted retail display.

Chemical analyses for nitrate and nitrite of Test Solutions A to D were carried out.

Test Solution A had 15 ppm nitrate and 236 ppm nitrite;
Test Solution B had 31 ppm nitrate and 542 ppm nitrite;
Test Solution C had 21 ppm nitrate and 271 ppm nitrite; and
Test Solution D had 42 ppm nitrate and 666 ppm nitrite.

Instrumental color tests were performed as described in the previous examples.

Results

Figure 13:
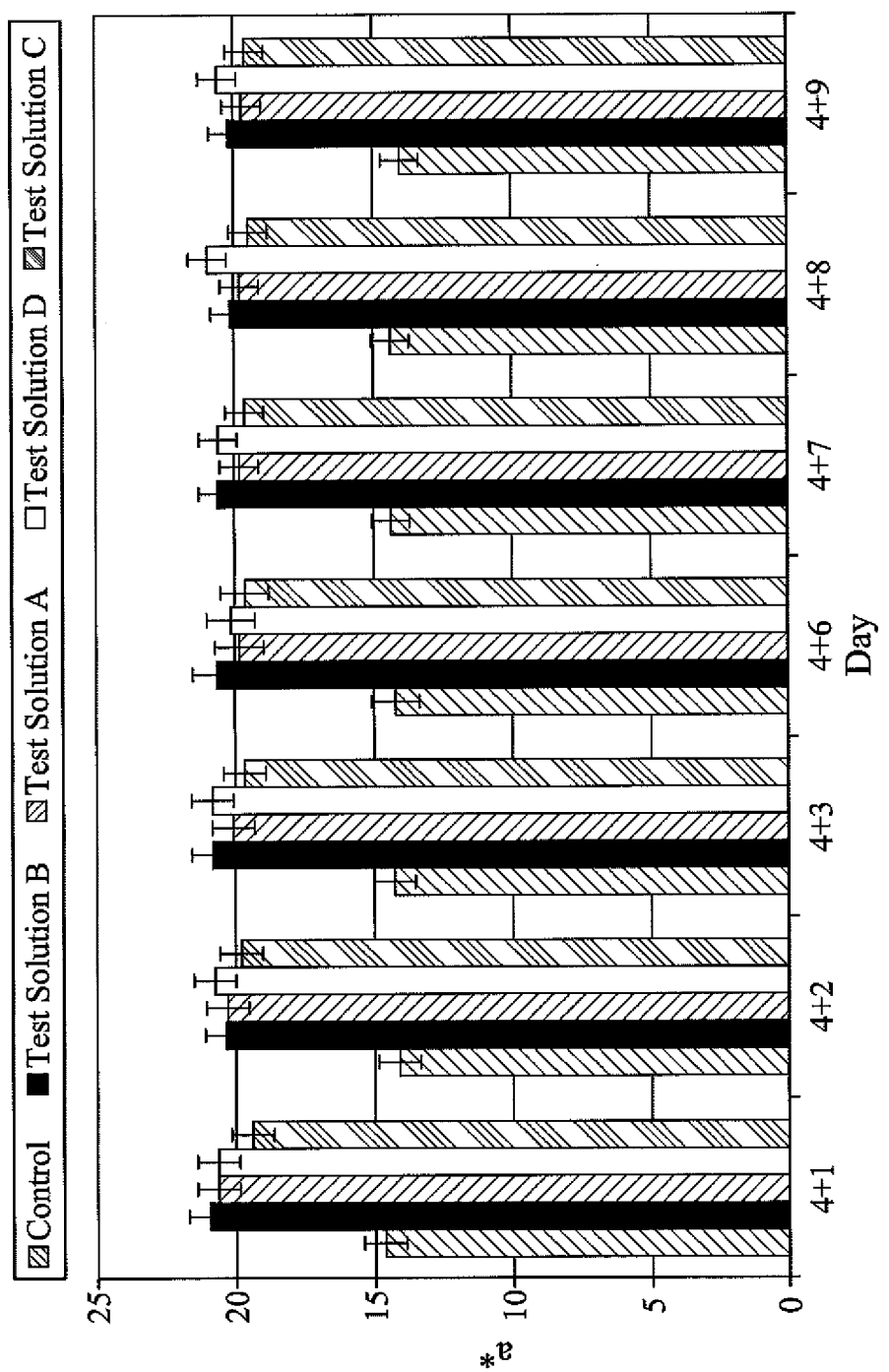
FIGS. 13-20 correspond to Example 6 below.
Figure 14:
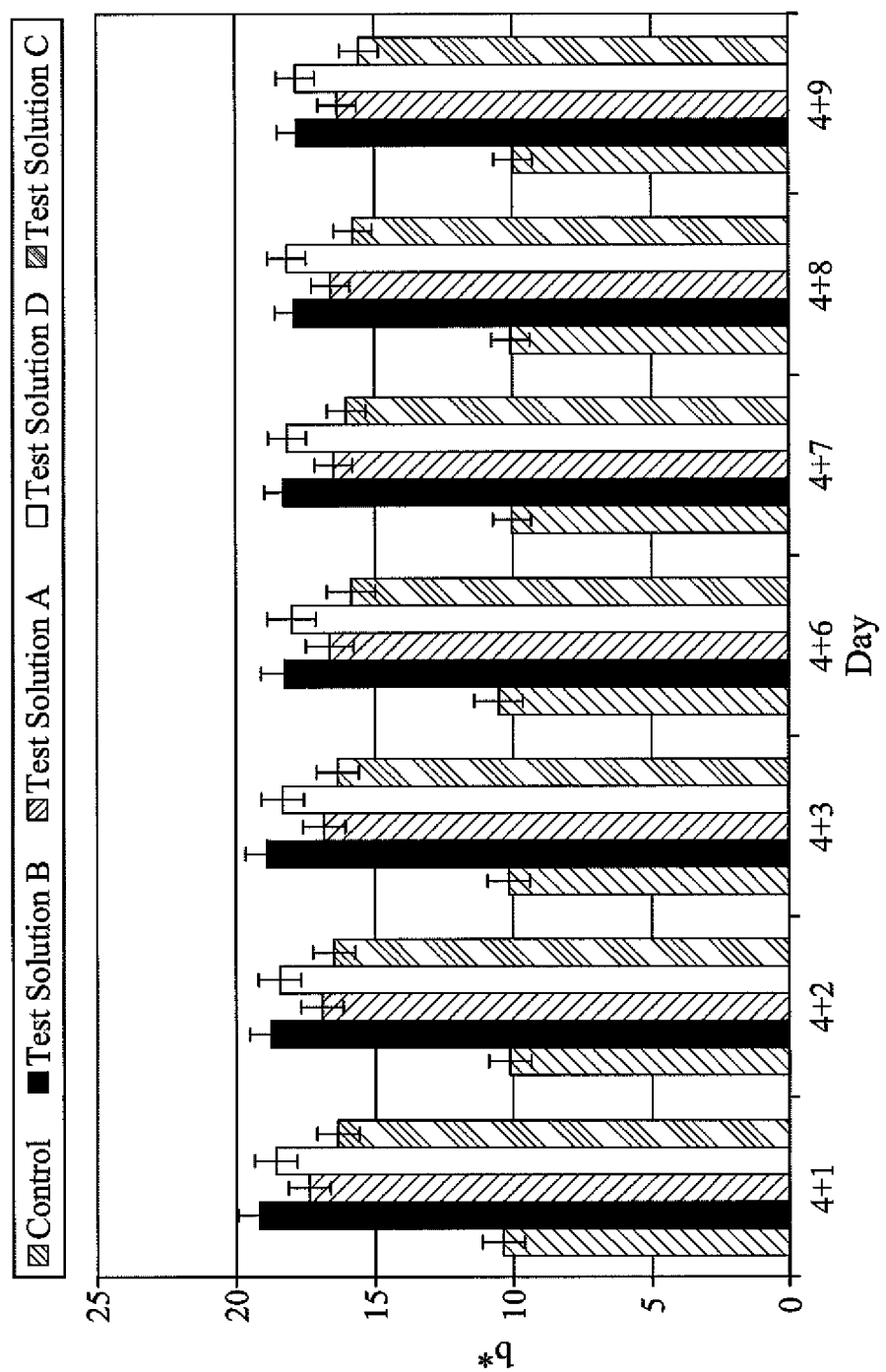
Figure 15:
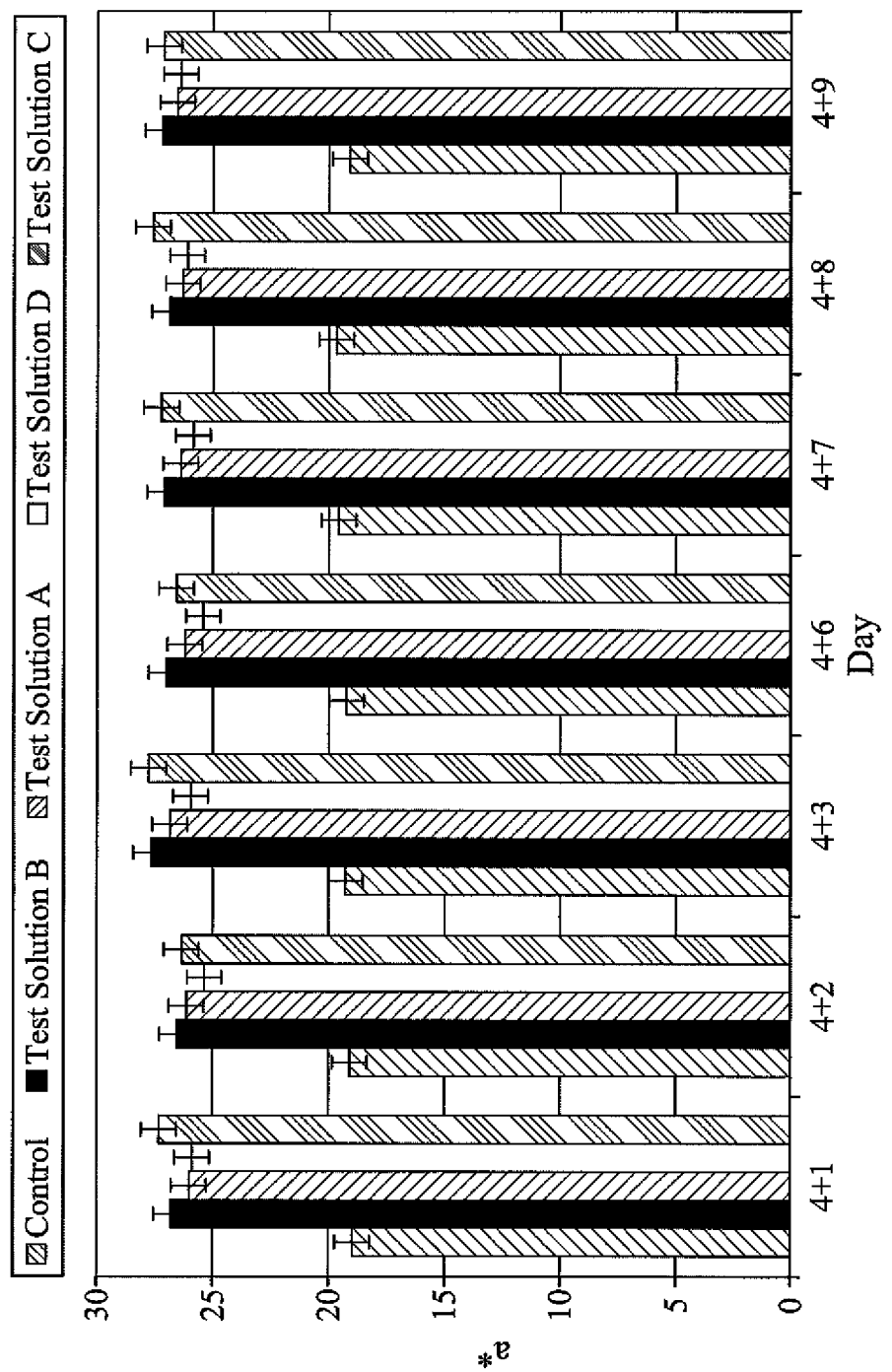
Figure 16:
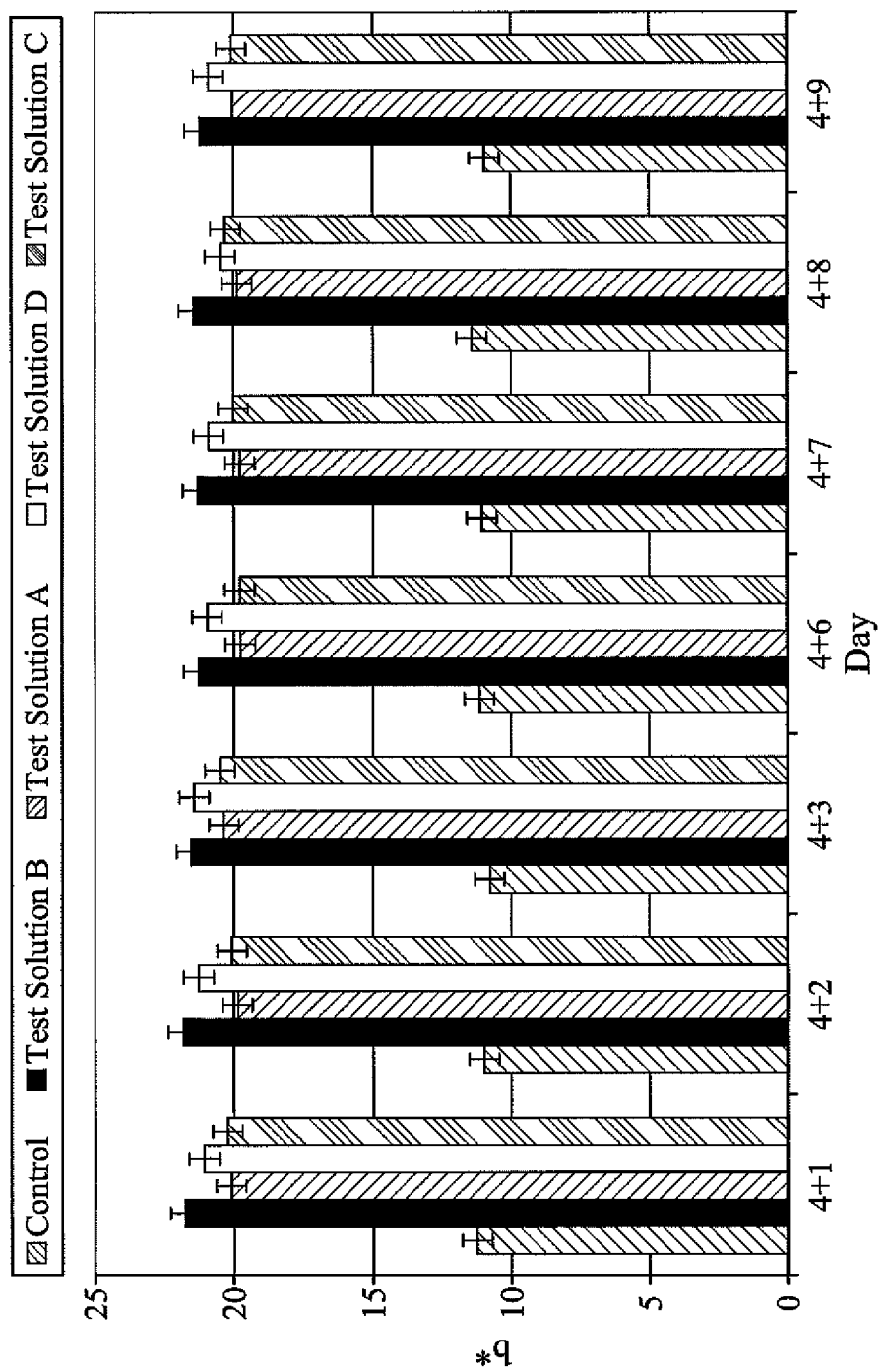

The results for instrumental color are depicted in FIGS. 13 and 14 of the drawings for pork loin chops and in FIGS. 15 and 16 of the drawings for pork blade steaks. Untreated loin chops were less red and less yellow than any of the pre-reacted treatments. This is consistent with the previous trials on beef. There were generally no significant differences in a* values among all four Test Solutions. However, Test Solutions A and C were generally less yellow than Test Solutions B and D. This would indicate a slight decrease in overall color with Test Solutions A and C on pork chops or blade steaks.

Figure 17:
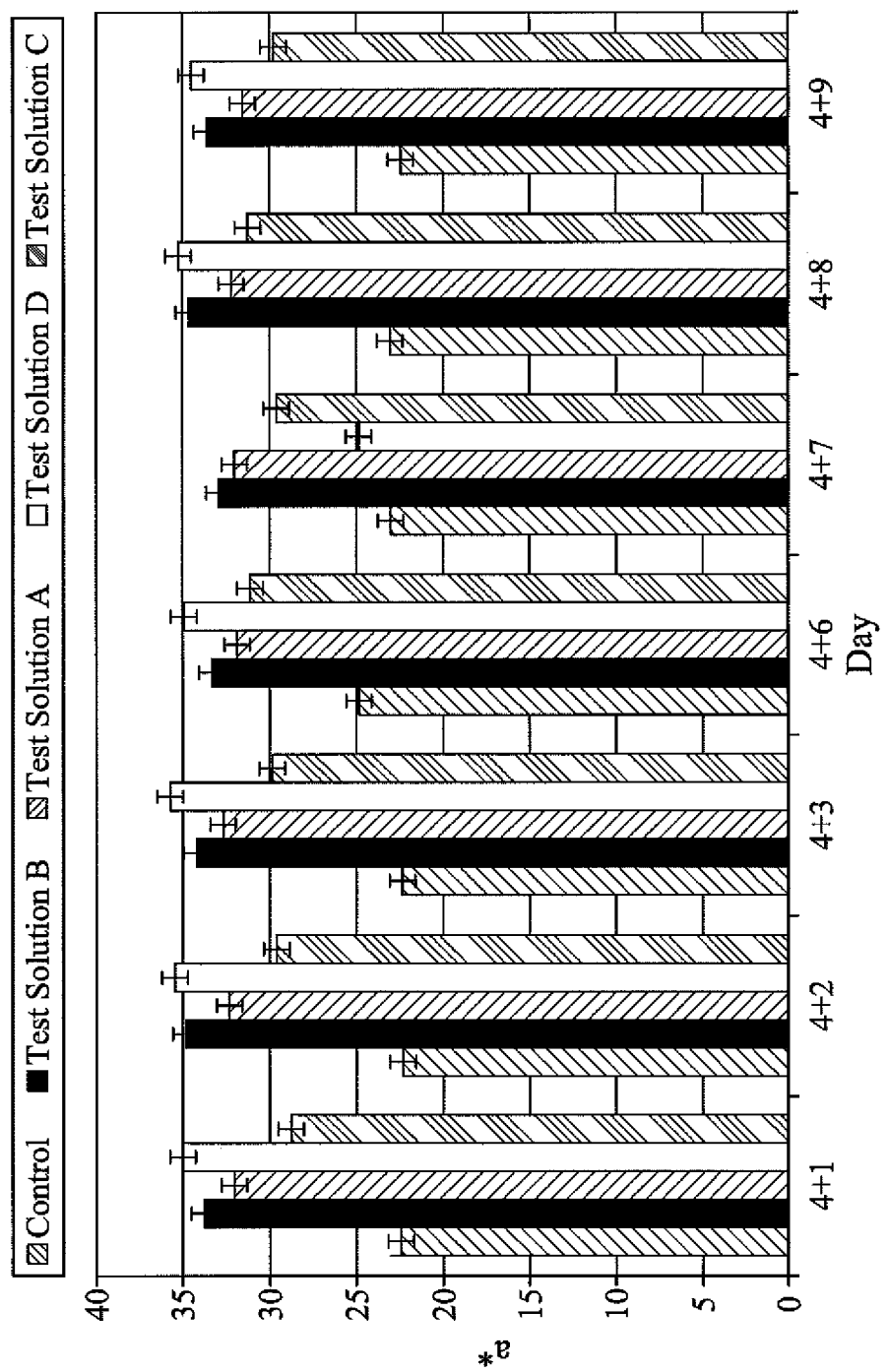
Figure 18:
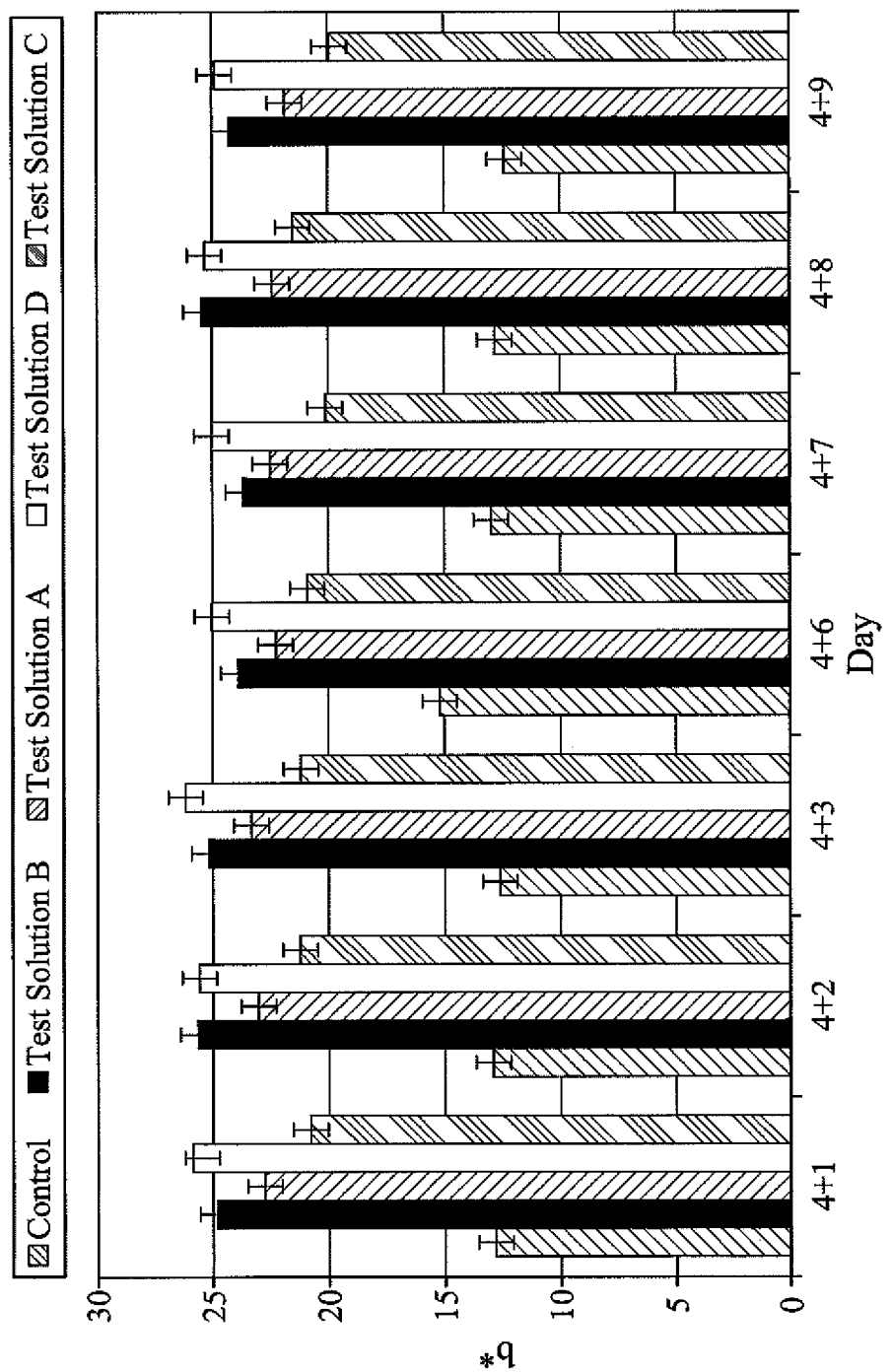
Figure 19:
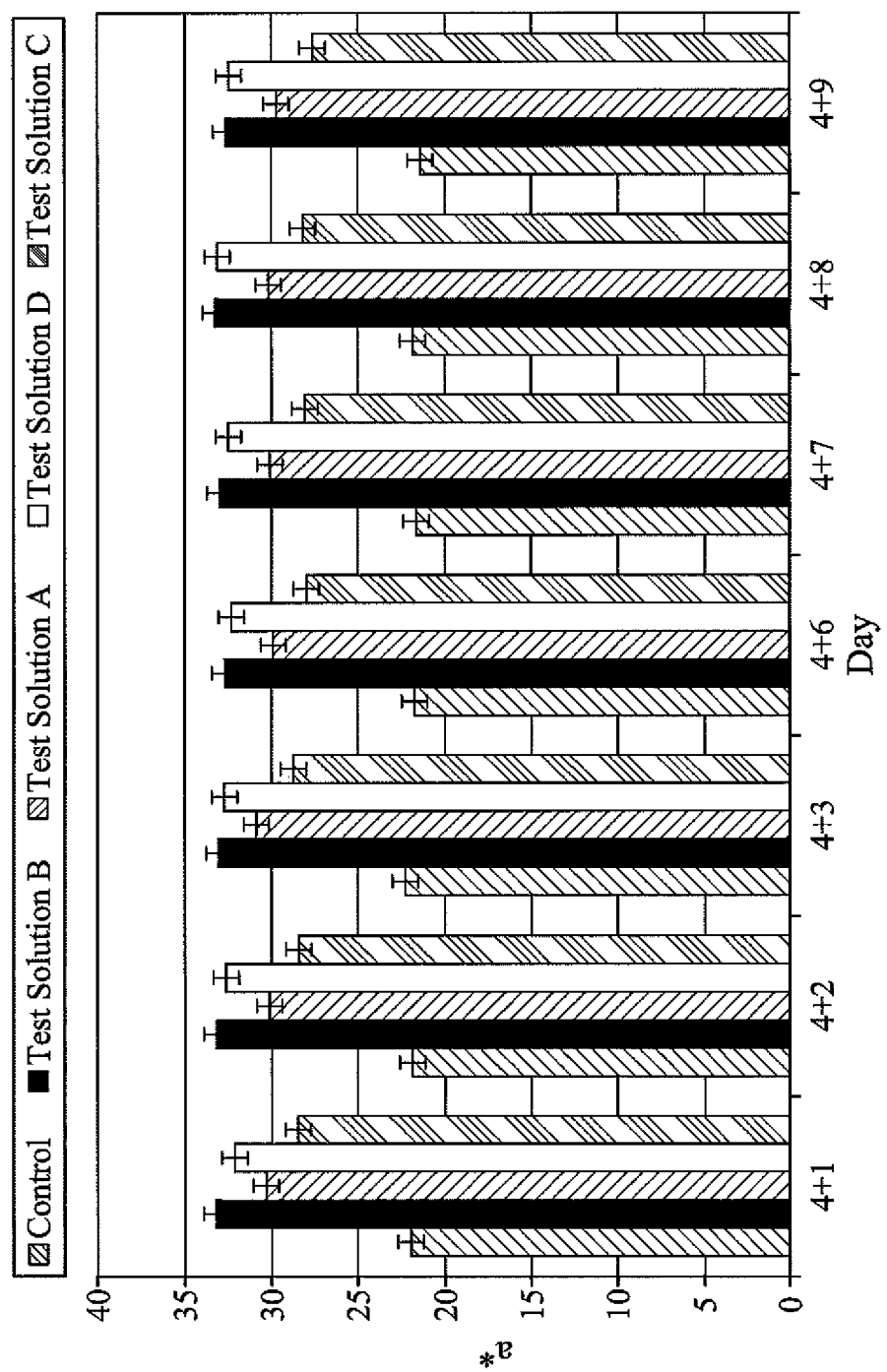
Figure 20:
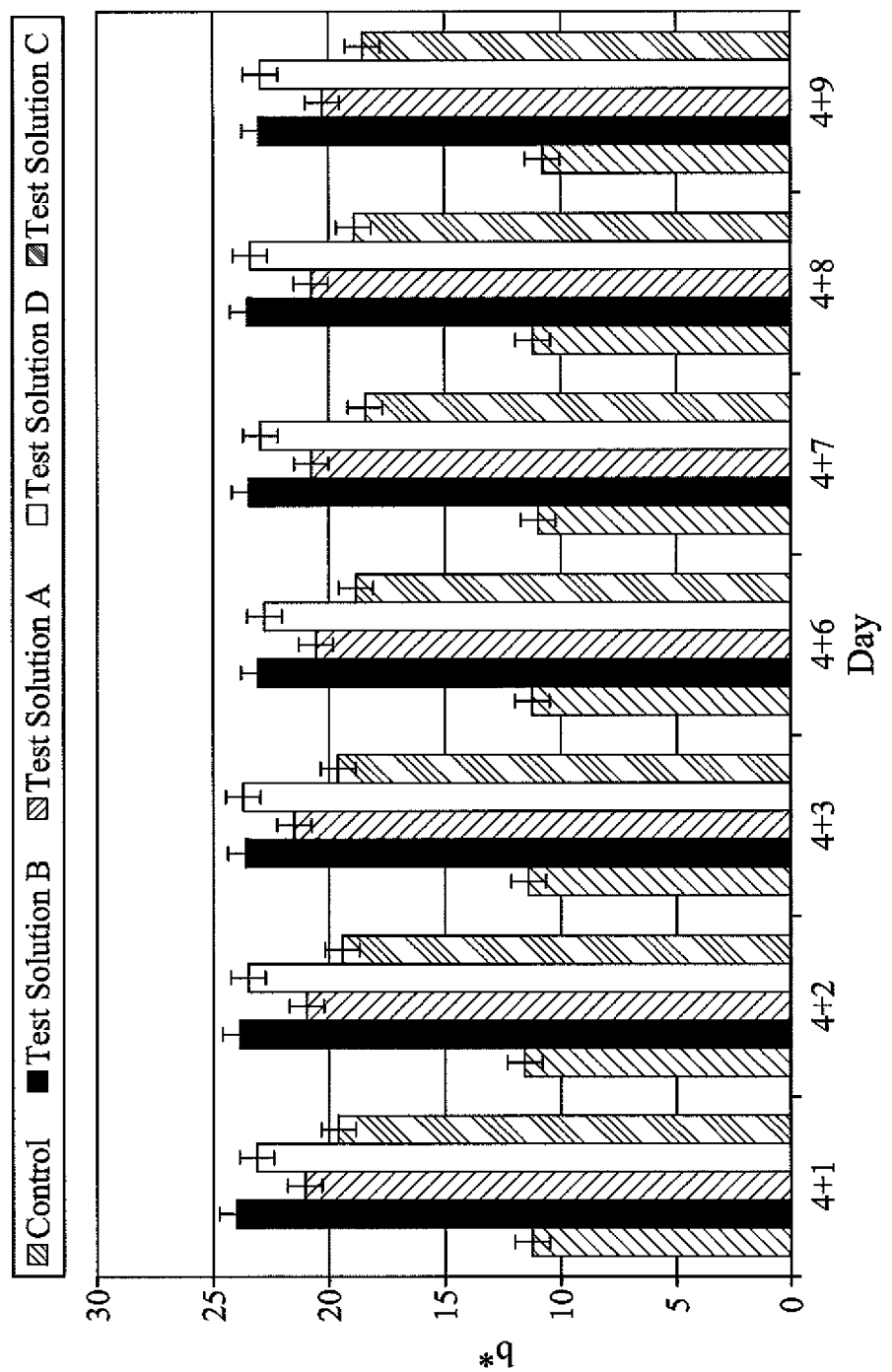

The results for instrumental color are depicted in FIGS. 17 and 18 of the drawings for beef sirloin steaks and in FIGS.

19 and 20 of the drawings for beef strip steaks. Untreated steaks had the lowest a* and b* values across the two products. Generally, a* and b* values were similar for Test Solutions B and D. However, a* and b* values were generally lower for Test Solutions A and C, with Test Solution C being lower than the other three Test Solutions. With the slight differences in solution nitrite concentrations between Test Solutions A and C, the cause is not known. However, this does suggest that the celery powder may exhibit properties independent of nitrite concentrations that enhance the surface color development. Additionally, this study further supports the conclusion that utilizing pre-reacted celery from two differing commercial sources may provide a superior color formation in both pork and beef in a vacuum-packaged format.

EXAMPLE 7

Objective

The objective of this study was to assess the surface color effect of two solution concentrations from two different sources of pre-reacted celery powder on ground beef and boneless/skinless chicken breasts under vacuum packaging.

Methodology

Fresh 80/20 ground beef was portioned into 1 lb. loaves. Boneless/skinless chicken breasts weighing 0.7 to 0.9 lbs. were randomly allocated to the respective treatments and vacuum-packaged in pairs. The test solutions described in Example 6 were the same solutions used in the current example.

Ground beef and chicken breasts were packaged and treated with the above solutions as described in previous examples (n=5 per solution and control). The meat was stored under dark conditions at 32-34° F. for 7 days and thereafter placed in a lighted retail display case for an additional 2 days. Instrumental color was assessed in triplicate locations on all test portions for each experimental group as described in the previous examples.

Results

Figure 21:
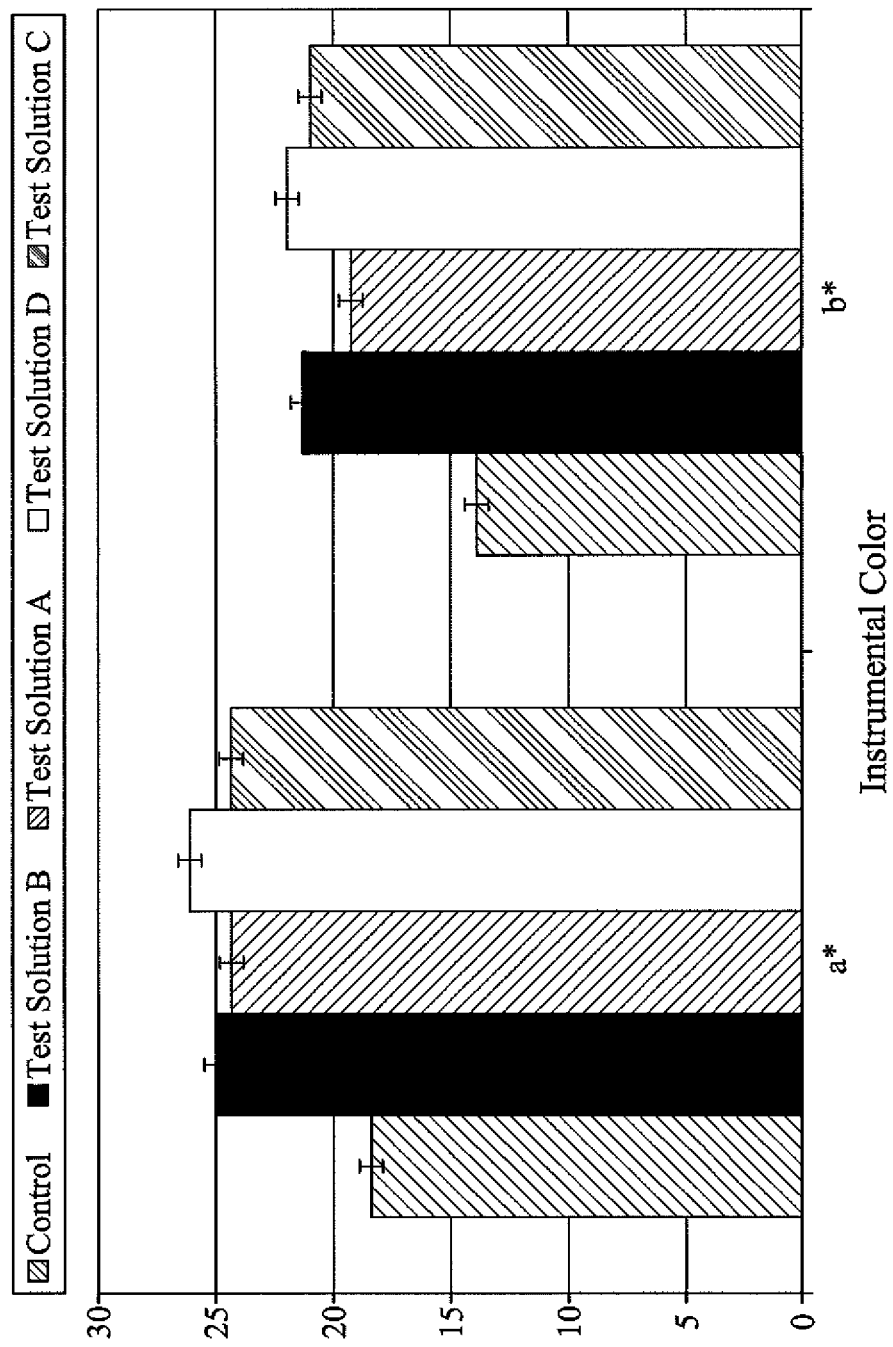
FIG. 21 correspond to Example 7 below and include a* and b* results for the ground beef treatments.
Figure 22:
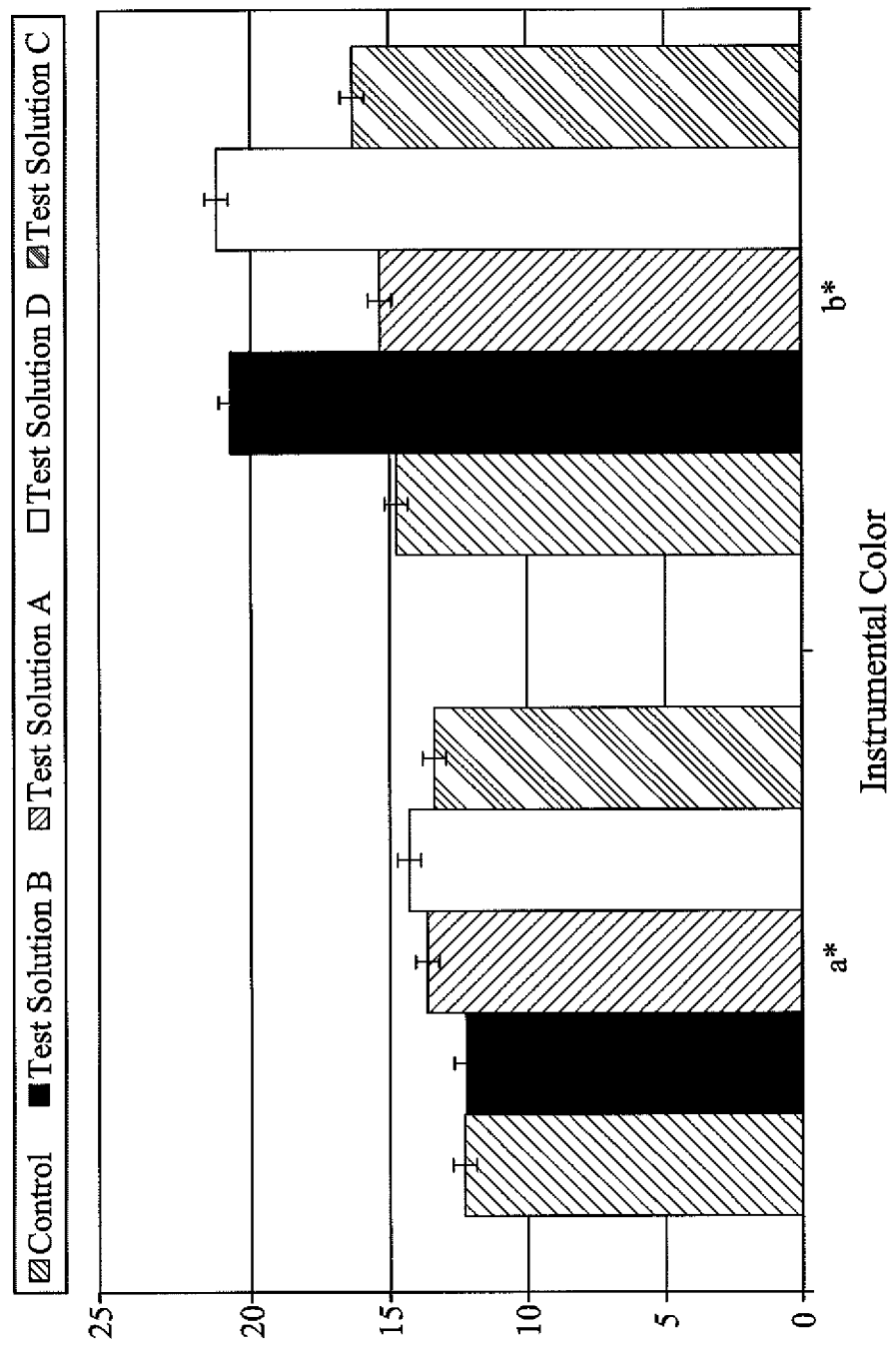
FIG. 22 corresponds to Example 7 below and includes a* and b* results for the boneless/skinless chicken breast treatments.

FIGS. 21 and 22 of the drawings include a* and b* results for the ground beef treatments. These results indicate that the platform for utilizing pre-reacted solutions on ground beef can achieve the same color performance as that on whole-muscle meat items.

FIG. 23 of the drawings includes a* and b* results for the boneless/skinless chicken breast treatments. While the impact is not as dramatic with poultry due to the decreased myoglobin content, the results do indicate that color can be improved and increased yellowness can be achieved with Test Solutions B and D. These results would support that pre-reacted solutions could be utilized on poultry as well.

Thus, the inventive method, meat color improvement solution and pre-packaged food product performed very well.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

Thus, the present invention is well adapted to carry out the objects and attain the ends and advantages mentioned and alluded to as well as those which are inherent therein.

What is claimed is:

1. A method of packaging a fresh meat product in a package that contains a low oxygen environment, comprising the steps of:
   (a) providing a natural plant component that has been fermented to convert naturally occurring nitrates therein to nitrites, said fermented natural plant component including an amount of nitrites;
   (b) after step (a), applying said fermented natural plant component to a surface of the fresh meat product, wherein the amount of nitrites in the fermented natural plant component is sufficient to impart from 0.1 to 100 parts per million nitrites, based on the total parts of the fresh meat product, to the fresh meat product to thereby convert myoglobin in the fresh meat product to nitrosomyoglobin; and
   (c) after step (b), sealing said fresh meat product in a package that contains a low oxygen environment.

2. The method of claim 1, wherein said natural plant component is selected from celery, celery extract, carrots, carrot extract, spinach, spinach extract, beets, beet extract and mixtures thereof.

3. The method of claim 2, wherein said natural plant component is selected from celery, celery extract and mixtures thereof.

4. The method of claim 3, wherein said natural plant component is celery powder.

5. The method of claim 1, wherein said fresh meat product is selected from beef, chicken and pork.

6. The method of claim 5, wherein said fresh meat product is beef.

7. The method of claim 1, wherein said package contains no greater than about 1% by volume oxygen based on the total volume of gas in said package.

8. The method of claim 1, wherein said fresh meat product is sealed in said package by a vacuum packaging technique.

9. The method of claim 8, wherein said fresh meat product is sealed in said package in a manner such that the atmospheric pressure in said package is in the range of from about zero mbar to about 20 mbar.

10. The method of claim 1, wherein said fresh meat product is sealed in said package by a modified atmosphere packaging technique.

11. The method of claim 10, wherein the atmosphere in said sealed package consists essentially of nitrogen.

12. The method of packaging a fresh meat product in a package that contains a low oxygen environment, comprising the steps of:
   (a) providing a natural plant component that has been fermented to convert naturally occurring nitrates therein to nitrites;
   (b) admixing said fermented natural plant component in a base liquid to form a meat color improvement solution, wherein said fermented natural plant component is admixed in said base liquid in an amount sufficient to impart in the range of from about 100 parts per million nitrites to about 1,000 parts per million nitrites, based on the total parts of said meat color improvement solution, to said meat color improvement solution; and
   (c) applying said meat color improvement solution to a surface of the fresh meant product to thereby convert myoglobin in the fresh meat product to nitrosomyoglobin.

13. The method of claim 12, wherein said base liquid consists essentially of water.

14. The method of claim 12, wherein said meat color improvement solution is applied to a surface of said fresh meat product by spraying said solution onto said surface.

15. The method of claim 12, wherein said meat color improvement solution is applied to a surface of the meat product by dipping said meat product into said solution.

16. The method of claim 12, wherein said meat color improvement solution further includes a diffusion mitigation agent for lowering the concentration of nitrites needed to convert myoglobin in the fresh meat product to nitrosomyoglobin and thereby improve the color of said fresh meat product.

17. The method of claim 16, wherein said meat color improvement solution comprises in the range of from about 0.001% to about 10% by weight, based on the total weight of said solution, of said diffusion mitigation agent.

18. The method of claim 16, wherein said meat color improvement solution comprises in the range of from about 0.005% to about 5% by weight, based on the total weight of said solution, of said diffusion mitigation agent.

19. The method of claim 16, wherein said diffusion mitigation agent increases the viscosity of said meat color improvement solution.

20. The method of claim 16, wherein said diffusion mitigation agent is selected from xanthan gum, hydrocolloids, starches and mixtures thereof.

21. The method of claim 20, wherein said diffusion mitigation agent is xanthan gum.

22. A method of packaging a fresh meat product in a package that contains a low oxygen environment, comprising the steps of:
(a) providing a natural plant component that has been fermented to convert naturally occurring nitrates therein to nitrites such that said natural plant component includes an amount of nitrites;
(b) forming a meat color improvement solution, said meat color improvement solution including:
a base liquid;
said fermented natural plant component; and
a diffusion mitigation agent present in said base liquid for lowering the concentration of nitrites needed to convert myoglobin in the fresh meat product to nitrosomyoglobin and thereby improve the color of said fresh meat product, wherein the meat color improvement solution comprises in the range of from about 0.001% to about 10% by weight, based on the total weight of said solution, of said diffusion mitigation agent;
(c) after step (b), applying said meat color improvement solution to a surface of the fresh meat product so as to impart from 0.1 to 100 parts per million nitrites, based on the total parts of the fresh meat product, to the fresh meat product so that the color improvement solution converts myoglobin in the fresh meat product to nitrosomyoglobin, yet mitigating internal diffusion of nitrites into said fresh meat product; and
(d) after step (c), sealing said fresh meat product in a package that contains a low oxygen environment.

23. The method of claim 22, wherein said base liquid consists essentially of water.

24. The method of claim 22, wherein said natural plant component is selected from celery, celery extract, carrots, carrot extract, spinach, spinach extract, beets, beet extract and mixtures thereof.

25. The method of claim 24, wherein said natural plant component is selected from celery, celery extract and mixtures thereof.

26. The method of claim 22, wherein said fresh meat product is selected from beef, chicken and pork.

27. The method of claim 26, wherein said fresh meat product is beef.

28. The method of claim 22, wherein said package contains no greater than about 1% by volume oxygen based on the total volume of gas in said package.

29. The method of claim 22, wherein said fresh meat product is sealed in said package by a vacuum packaging technique.

30. The method of claim 22, wherein said fresh meat product is sealed in said package by a modified atmosphere packaging technique.

31. The method of claim 30, wherein the atmosphere in said sealed package consists essentially of nitrogen and carbon dioxide.

32. The method of claim 22, wherein said fermented natural plant component is admixed in said base liquid in an amount sufficient to impart in the range of from about 100 parts per million nitrites to about 1,000 parts per million nitrites, based on the total parts of said meat color improvement solution, to said meat color improvement solution.

33. The method of claim 22, wherein said meat color improvement solution comprises in the range of from about 0.005% to about 5% by weight, based on the total weight of said solution, of said diffusion mitigation agent.

34. The method of claim 22, wherein said diffusion mitigation agent increases the viscosity of the solution.

35. The method of claim 22, wherein said agent is selected from xanthan gum, hydrocolloids, starches and mixtures thereof.

36. The method of claim 35, wherein said agent is xanthan gum.

37. The method of claim 1, wherein said fermented natural plant component includes a sufficient amount of nitrites to impart in the range of from about 1 part per million nitrites to about 10 parts per million nitrites, based on the total parts of the fresh meat product, to the fresh meat product.

38. The method of claim 22, wherein said fermented natural plant component includes a sufficient amount of nitrites to impart in the range of from about 1 part per million nitrites to about 10 parts per million nitrites, based on the total parts of the fresh meat product, to the fresh meat product.

39. The method of claim 12, wherein said package contains no greater than about 1% by volume oxygen based on the total volume of gas in said package.

40. The method of claim 12, wherein said fresh meat product is sealed in said package in a manner such that the atmospheric pressure in said package is in the range of from about zero mbar to about 20 mbar.

41. The method of claim 12, wherein the atmosphere in said package consists essentially of nitrogen.

* * * * *